US007138596B2

(12) United States Patent
Pippin et al.

(10) Patent No.: US 7,138,596 B2
(45) Date of Patent: Nov. 21, 2006

(54) APPARATUS AND METHOD FOR MAIL SORTING

(76) Inventors: James M. Pippin, 800 Elaine, Keller, TX (US) 76248; Floyd W. Worth, II, 909 Lakeview, Richardson, TX (US) 75080; Dale E. Redford, 2922 Sutton Dr., Grand Prairie, TX (US) 75052-4522; Ottmar K. Kechel, 9321 Vista Cir., Irving, TX (US) 75063; George R. Mondie, 1816 Arthur's Cir., Bedford, TX (US) 76021-3521; Gerald A. Isaacs, 2012 Yawl Pl., Oriental, NC (US) 28571-9796

( * ) Notice: Subject to any disclaimer, the term of this patent is extended or adjusted under 35 U.S.C. 154(b) by 69 days.

(21) Appl. No.: 10/142,348

(22) Filed: May 9, 2002

(65) Prior Publication Data

US 2003/0038065 A1 Feb. 27, 2003

Related U.S. Application Data

(60) Provisional application No. 60/309,402, filed on Aug. 1, 2001.

(51) Int. Cl.
*B07C 5/00* (2006.01)
*B65G 1/133* (2006.01)

(52) U.S. Cl. ...................... 209/584; 209/900; 700/225; 700/219; 700/223; 414/751.1

(58) Field of Classification Search ................ 209/584, 209/900; 700/219, 223, 224, 225, 226
See application file for complete search history.

(56) References Cited

U.S. PATENT DOCUMENTS

| | | | | | |
|---|---|---|---|---|---|
| 1,204,428 | A | | 11/1916 | Grandfield | |
| 3,732,978 | A | | 5/1973 | Reader | 209/122 |
| 3,905,896 | A | | 9/1975 | Jackson et al. | 209/124 |
| 4,310,276 | A | * | 1/1982 | Castagnoli | 198/367.1 |
| 4,509,635 | A | * | 4/1985 | Emsley et al. | 198/370.03 |
| 4,554,873 | A | | 11/1985 | Rex | 104/88 |
| 4,679,149 | A | | 7/1987 | Merz | 364/478 |
| 4,756,657 | A | * | 7/1988 | Kinney | 414/281 |
| 4,963,251 | A | * | 10/1990 | Bohm et al. | 209/564 |
| 4,997,337 | A | | 3/1991 | Trimble | 414/790.4 |
| 5,000,325 | A | | 3/1991 | D'Elis | 209/702 |
| 5,086,929 | A | | 2/1992 | Richter et al. | 209/698 |
| 5,174,454 | A | * | 12/1992 | Parkander | 209/3.3 |
| 5,188,210 | A | | 2/1993 | Malow | 198/369 |
| 5,240,118 | A | | 8/1993 | Mayer | 209/539 |
| 5,346,351 | A | * | 9/1994 | Priolo et al. | 414/277 |

(Continued)

*Primary Examiner*—Kathy Matecki
*Assistant Examiner*—Jonathan R Miller
(74) *Attorney, Agent, or Firm*—Siemens Corporation

(57) ABSTRACT

A method for sorting mail to a case having a plurality of slots is described, wherein each slot corresponds to a destination. The method includes steps of loading a mail piece to be sorted into a delivery robot, determining for the mail piece a destination slot the mail piece is to be delivered to, moving the delivery robot along a rail disposed at the front of the case near the slots into proximity with an open end of the destination slot, inserting the mail piece from the delivery robot into the associated slot, and returning the delivery robot to a loading station whereby the cycle may be repeated. Such a method, when using a large number of robots moving along a common rail system, can sort a large volume of mail in carrier delivery order.

26 Claims, 23 Drawing Sheets

U.S. PATENT DOCUMENTS

| | | | | | |
|---|---|---|---|---|---|
| 5,405,232 | A | * | 4/1995 | Lloyd et al. | 414/280 |
| 5,590,794 | A | | 1/1997 | Zachary | 209/702 |
| 5,634,760 | A | * | 6/1997 | Anderson et al. | 414/268 |
| 5,845,785 | A | | 12/1998 | Oppliger et al. | 209/584 |
| 5,994,657 | A | | 11/1999 | Maier et al. | 209/584 |
| 6,026,967 | A | * | 2/2000 | Isaacs et al. | 209/539 |
| 6,079,570 | A | | 6/2000 | Oppliger et al. | 209/630 |
| 6,082,521 | A | | 7/2000 | Maier et al. | 198/349.6 |
| 6,555,776 | B1 | | 4/2003 | Roth et al. | 209/584 |
| 6,762,382 | B1 | * | 7/2004 | Danelski | 209/583 |

* cited by examiner

APPARATUS AND METHOD FOR MAIL SORTING

This application claims priority of U.S. Provisional Application No. 60/309,402, filed Aug. 1, 2001.

TECHNICAL FIELD

The present invention relates to the field of mail sorting, and particularly to an apparatus and method for loading mail pieces into individual receptacles such as slots or pockets.

BACKGROUND OF THE INVENTION

Each day more than 200,000 United States Postal Service (USPS) carriers deliver mail to approximately 100 million individual domestic addresses. The mail received and delivered by the USPS generally consists of three broad types of items, namely letters, flat mail that is larger than letter mail, and parcels. The term "letter" is generally used to refer to postcards, standard sized letters and mail pieces of similar dimensions, whereas the term "flat" is generally used to refer to magazines, catalogues and similar, larger mail pieces. Before a carrier begins to walk or drive through his or her delivery route, it is the carrier's responsibility to put all of this mail into an appropriate sequence for efficient delivery.

Under the present USPS procedure, the carrier assembles at least three sequenced stacks of mail, including letters, flats (including enveloped and non-enveloped magazines), and parcels. The carrier may also have one or more additional sequenced stacks, e.g., pre-sorted mass-mail items to be delivered to many or all of the stops on the delivery route. Thus, at each delivery stop the carrier selects the items for that address from each of the various stacks and puts them all into the postal patron's mailbox. This sorting and shuffling through various stacks of mail is time consuming, inefficient, and consequently expensive to the USPS.

One approach to reducing the amount of handling required is to sort and assemble the mail by delivery point. However, current mail sorting systems are not adapted to sort and collect mail destined for a single delivery point or address as a discreet group of mail pieces. Rather, mail is typically sorted in delivery bar code sorting machines into bins using destination information scanned from the mail piece using a bar code scanner or optical character recognition equipment. Although these machines are capable of sorting mail pieces within a limited size and thickness range, these machines are limited to sorting the mail into delivery order. Further, a large fraction of mail is not processed with these machines and must be manually sorted, producing a multiplicity of groupings of mail sorted into delivery order. This leaves the carrier with the task, at each delivery point, of separately accessing each grouping or stack of mail and separating the mail within each group by delivery point.

Thus, there exists a need for an automated method and apparatus that is capable of sorting and assembling mail pieces destined for a single delivery point into a single, discreet group for delivery by a carrier, as well as for reducing the amount of manual labor used to prepare or case mail for delivery.

SUMMARY OF THE INVENTION

The invention provides a method for sorting mail to a case having a plurality of slots, wherein each slot corresponds to a destination, such as a specific address. Such a method includes the steps of:

(a) loading a mail piece to be sorted into a delivery robot;

(b) determining for the mail piece a destination slot the mail piece is to be delivered to;

(c) moving the delivery robot along a rail disposed at the front of the case near the slots into proximity with an open end of the destination slot;

(d) inserting the mail piece from the delivery robot into the associated slot; and (e) returning the delivery robot to a loading station whereby steps (a)–(d) may be repeated.

The delivery robot moves along a rail or other guide structure mounted above and/or below a horizontal row of the slots. According to one aspect of the invention, each slot is filled with a plastic bag that can be pulled down after sorting in completed, as described in commonly assigned co-pending U.S. patent application Ser. No. 09/924,155, filed Nov. 26, 2001, the contents of which are incorporated by reference herein. The slot, with or without its bag, may already be partly filled with mail when another mail piece is to be inserted by the delivery robot. According to a preferred form of the invention, a special automated insertion mechanism is provided which can assure that a mail piece can be added to the slot without damaging the mail piece and without crushing or pulling out mail pieces already in the slot. For this purpose step (d) preferably further comprises extending an insertion mechanism holding the mail piece into the slot, and retracting the insertion mechanism from the slot in a manner effective to leave the mail piece in the slot.

According to another aspect of the invention, the case into which mail is sorted is built onto a rolling cart. At the end of the sorting run, an insert defining the series of separator slots is removed from the rolling case to allow the case to move away from the sorting machine into a truck or to another destination. Prior to the next sorting run, empty cases are rolled into predetermined positions alongside the fixed guide frame located at the front side of the case, and the insert defining the slots is moved into the case to facilitate sortation.

An automated system for sorting a series of mail pieces according to the invention includes a rail system forming a loop, a number of mail piece delivery robots mounted on the rail for movement along the loop, each delivery robot having an insertion mechanism that can receive a mail piece therein and then insert it into a destination slot, an automated loading station including a conveyor having a loading end at which a mail piece exits the conveyer and enters the insertion mechanism of an delivery robot positioned on the rail in alignment with the loading station, a case disposed along the rail for receiving mail sorted thereto for a plurality of destinations in delivery order, means such as an onboard propulsion system for moving the delivery robots from the loading station to the case and back to the loading station on the loop, and a control system that coordinates movement of the delivery robots so that each delivery robot moves from the loading station to a slot which corresponds to a destination indicated on the mail piece and then returns to the loading station to receive another mail piece for sorting. The case may have predefined slots into which mail pieces are inserted, which slots correspond to specific destinations, or slots may be defined by paired guides and partitions mounted on a rack by means of a movable frame that allows such guides and partitions to be inserted into the case.

The invention also provides a method of inserting a second flat article into a slot or similar opening having at least one first article positioned in the slot. Such a method includes the steps of (a) positioning an inserter apparatus in the slot adjacent to a first side of moveable guide, the moveable guide being positioned between the inserter apparatus and first article, the inserter apparatus carrying the second article, and (b) retracting the moveable guide from the slot, the moveable guide having a guide stripper surface in contact with the first article, and separating the guide stripper surface from the first article in a lateral direction as the moveable guide is retracted so that the portion of the guide stripper surface in contact with the first article does not move relative to the first article until separated, the guide stripper surface (e.g., a movable belt) being separated from the first article simultaneously with the retraction of the guide from the slot.

An inserter apparatus according to the invention useful for sorting mail pieces or other articles includes a frame, a pair of inserter plates spaced to receive a mail piece therebetween, a first guide disposed on the frame on which the inserter plates can move from a retracted position to an extended position, an H-shaped belt including two loops united by a lateral connecting portion, the loops being slidably mounted on each of the plates, a first drive system disposed on the frame for moving the plates and belt between the extended and retracted positions, and a second drive system disposed on the frame and connected to the connecting portion of the belt for moving the connecting portion of the belt forward and back along the plates, causing sliding movement of the loops around the outsides of each of the belts, with forward movement being effective to move a mail piece received by the belt ahead of the connecting portion out of a front end opening of the plates, and rearward movement being effective to draw a mail piece received in the front end opening of the plates rearwardly to a position between the plates. The H-shaped belt does not move relative to the mail piece as it is inserted.

The invention further provides other innovations related to mail sorting as discussed in the detailed description which follows. For example, spring loaded partitions that can move more than one pitch or slot width allow overfilling and move so that the inserter thickness does not reduce the capacity of the slot. The invention further provides a method and apparatus for simultaneous insertion, packaging, traying, containerizing of mail, and a portable mail case for use in such a method in which mail can be sorted directly into trays. Where plastic bags are mounted in the case instead of using fixed slot dividers, the invention provides a method and apparatus for simultaneous loading into bag, tray, and container (rolling case). The invention further provides a loading system for a delivery robot wherein synchronized moving belts are used to ensure that a mail piece is smoothly transferred from a loading conveyer to the delivery robot. Specifically, controlled loading of a mail piece into an H-belt on the delivery robot is controlled by retraction of a belt drive post to achieve controlled deceleration of the mail piece. Further, since the system of the invention permits sorting to a relatively large number of slots or bags in a relatively compact space, the invention permits single pass sortation of mail in delivery order on a reasonable scale of system size and density. The system of the invention also achieves such sortation without any bending of mail pieces and accommodates mail of varying sizes and thicknesses, i.e., mixed mail. The invention also provides a method and apparatus for single step sorting directly to mail trays positioned in delivery carts, eliminating the traditional steps of manual sorting to a mail case and then pulling down the sorted mail into trays. These and other aspects of the invention are set forth in the detailed description which follows.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 17 is the top view of FIG. 16, with the wings folded in;

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Figure 1:
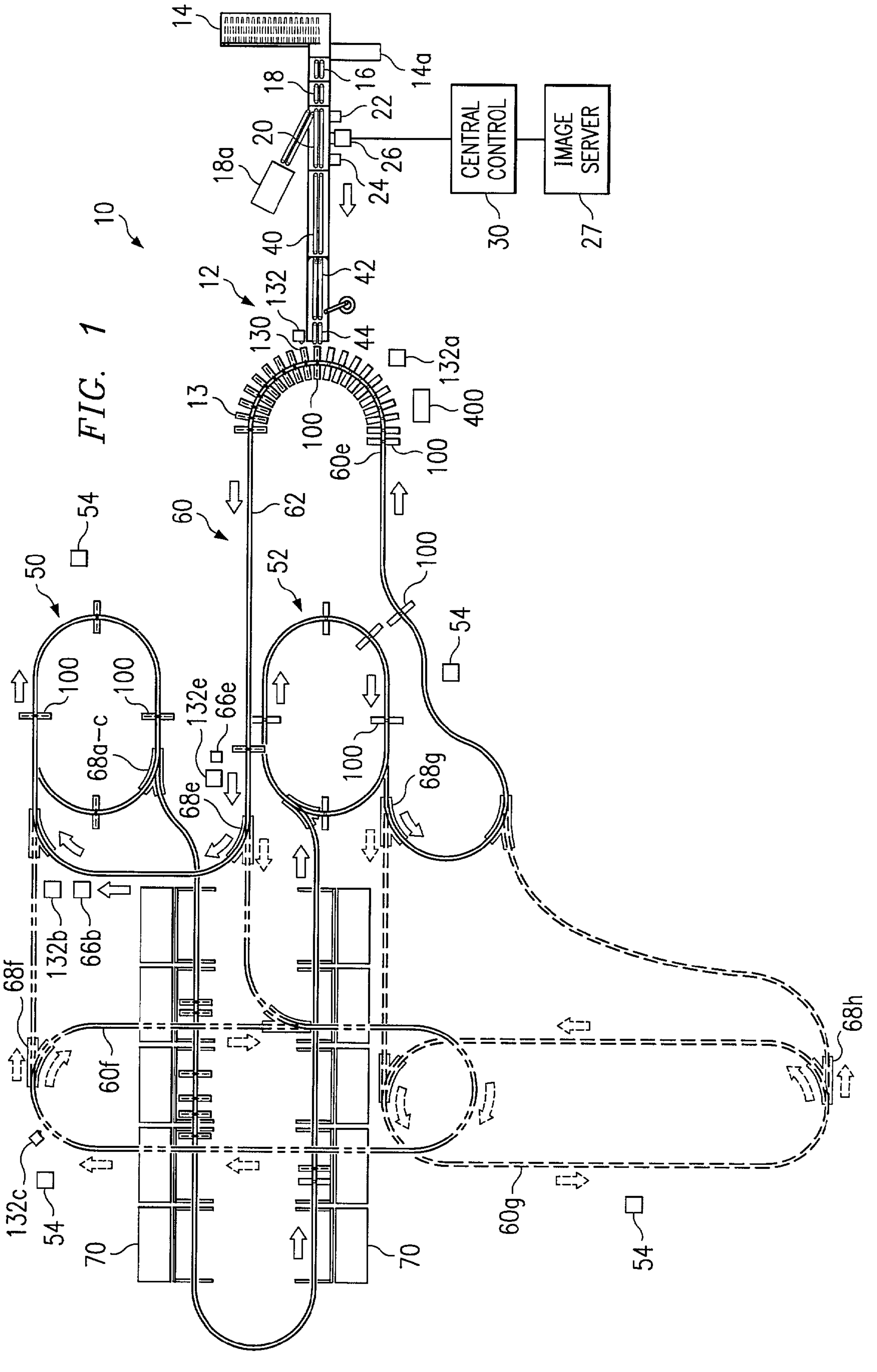
FIG. 1 is a schematic representation of a mail sorting and handling system according to the invention.
Figure 2:
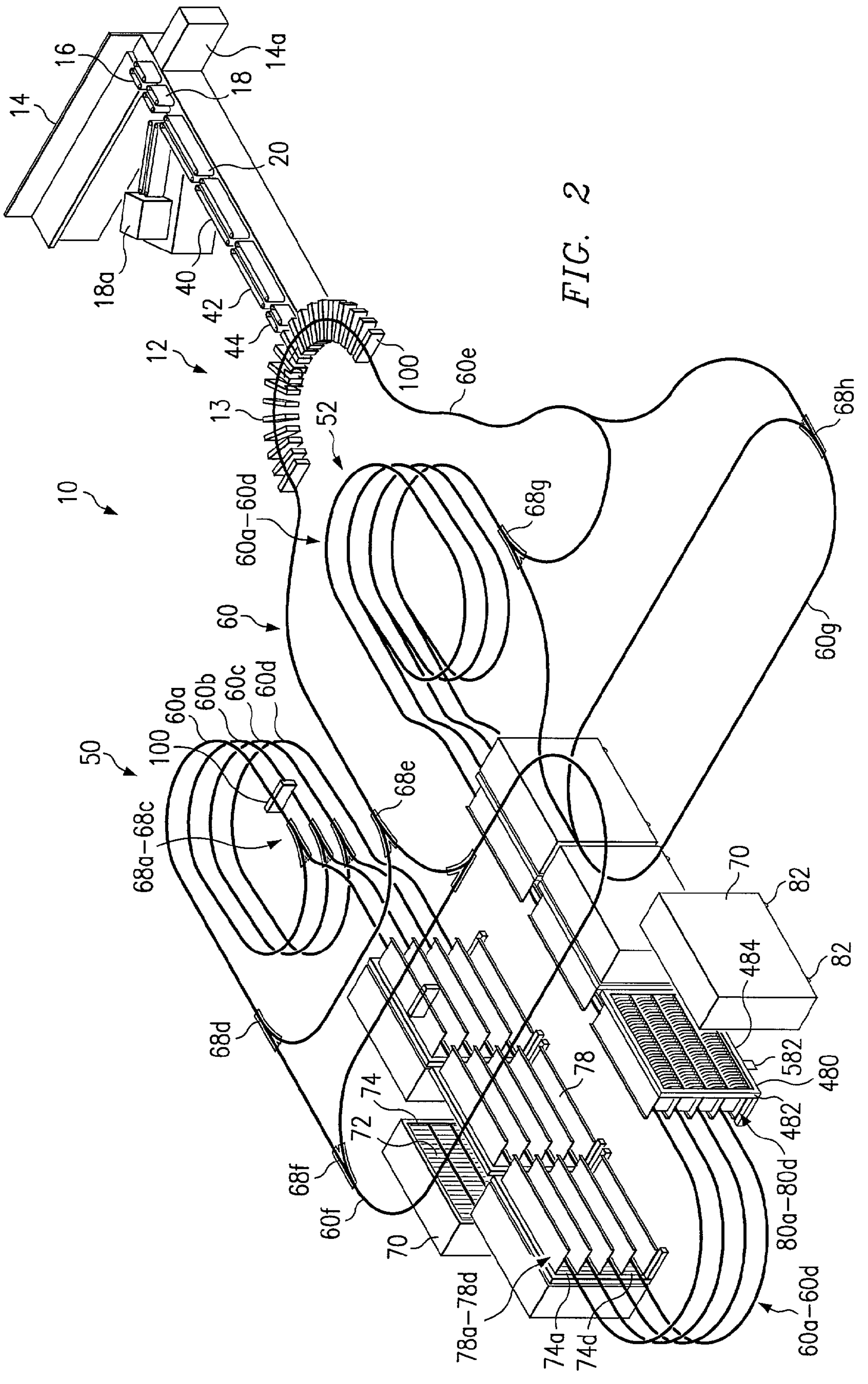
FIG. 2 is a partial perspective view of the mail handling system of claim 1.

Turning to FIGS. 1 and 2, a mail handling and sorting system 10 includes one or more loading stations 12 each including a mail feeder 14 plus double feed detector (14*b*), a conventional mail piece leveler 16, an oversized mail piece detection and divert module 18 with divert conveyor 18*a*, and a read station 20 that includes one or more of a fluorescent bar code reader 22, and an image lift unit or scanner unit 26 for processing the image data in an optical character reader (OCR) 24 and/or in a video encoding system (VCS) and or in a wide area bar code reader (WABCR). A second mail feeder 14*a* may be provided for manual feeding and keying of recycled mail pieces or mail pieces that cannot be processed through mail feeder 14. Mail processed through loading station 12 is received by a transfer conveyor 40 and then passed to a first loading conveyor 42, then to a second loading conveyor 44. Conveyors 40, 42 and 44 are opposed belt conveyors designed to capture and transport flat items such as mail pieces between the opposed belts in an upright (on bottom edge) position.

In operation, an unordered batch of unsorted mail is loaded into feeder 14 which singulates and feed the mail pieces to leveler 16 by means of a pickoff mechanism that removes mail pieces from the end of an edgewise stack one at a time. One such feeder is disclosed in co-pending, commonly assigned U.S. application Ser. No. 09/954,482, filed Sep. 17, 2001 and 09/954,483, also filed Sep. 17, 2001, the disclosures of which are incorporated herein by reference. The mail pieces then enter detection module 18 where overlapping, oversized and/or overweight mail pieces are detected and diverted onto divert conveyor 18*a* for further processing. The individual components loading of station 12 are known in art.

Destination information appearing on the surfaces of mail pieces passing through read station 20 is scanned with fluorescent bar code reader 22 and/or scanner 24 which transmits to the scanned images to a central computer 30 for resolution with bar code and OCR character recognition software according to known methods. OCR software can also be run locally at read station 20. The resolved destination information for the mail piece is stored at least temporarily in memory of computer 30 or in a stored database accessed by computer 30. A video image of each mail piece passing through read station 20 is captured by scanner 24 (e.g., a grayscale digital camera) and sent to a video image server or recorder 27 which stores the video image for transmission to a human operator for resolution and manual entry of the destination data in the event that the OCR computer cannot resolve a bar code or OCR image data for a mail piece. After scanning, the stream of mail pieces is conveyed through transfer conveyor 40 to first and second loading conveyors 42 and 44, respectively, which load the mail pieces onto an automated delivery unit or robot 100 for delivery to the location selected by central computer 30 as set forth below. Computer 30 controls operations of conveyors 40, 42, 44 according to an overall control scheme which maintains a steady feed of mail pieces into the sorting system and tracks each mail piece through conveyors 40, 42, 44 so that the destination of the mail piece to be loaded into a robot 100 is always known by computer 30.

Mail handling system 10 of the invention utilizes a plurality of delivery robots 100 that receive mail pieces from loading station 12, travel along a track system 60 to insert each of the mail pieces to a selected one of a plurality of slots 72 in one or more of mail cases 70, and then return to loading station 12 for reloading. Track system 60 includes one or more trolley rails 62 and an electrified power rail 64 (FIG. 10, 11). Each mail case 70 is a multi-tiered assembly with a plurality of slots 72 arranged in rows or tiers 74. Track system 60 includes a plurality of locally actuated switches 68 that are commanded to actuate by an infrared communications device mounted on each robot to alleviate the problems of central control and robot tracking. A series of support shelves 78 extending below trolley rails 62 are provided for supporting robots 100 through all or selected parts of the track system. In this example, shelves 78 are provided only where the rails 62 pass in front of cases 70. Rails 62, 64 are mounted on the undersides of shelves 78 as track 60 passes cases 70. Each robot 100 is identified with a bar code or other ID tag 118 (FIG. 3), optionally allowing bar code scanners positioned at various locations along track system 60 to identify the robot and transmit the robot's position to central computer 30. However, in the described embodiment, only a single bar code scanner 400 (FIG. 1) is used to confirm the identity of robots 100 incoming to the loading station 12. Once the robot has been loaded with mail and the corresponding destination transmitted via the IR device, the robot commands cause appropriate switches to actuate in order to reach the correct mail slot destination as further described hereafter.

It is possible to insert mail pieces into slot 72 by means of robots provided with little more than an ejection mechanism, if slots 72 are made sufficiently large that overcrowding of mail in each slot does not become a problem. Slots 72 could, for example, be in the nature of chutes each capable of holding a large amount of mail, with mail sliding to the end of the chute under the force of gravity. Each chute could end in a removal door or an opening having a plastic bag mounted thereon into which mail falling through the chute is collected. However, for ergonomic and slot density/floor space efficiency reasons, it is preferred to make slots 72 smaller, to the point where insertion of a mail piece into an almost-full slot becomes necessary. Further, as described in the foregoing U.S. Ser. No. 09/924,155, filed Nov. 26, 2001, it would be useful for slots 72 to comprise a series of bags mounted on a supporting frame so that the mail can be sorted in carrier delivery order directly to thin walled plastic delivery bags, without additional steps of removing the sorted mail from the slots and transporting it to a packaging or bagging machine.

Inserting a single mail piece into a slot or bag already partly filled with mail is a difficult task. If the mail piece is inserted by itself, without the support of an inserter that enters the slot with it, it may strike mail already in the slot and double up, causing insertion to fail. This is likely if the mail piece is thin and flexible compared to other mail being sorted. At the other extreme, if the mail piece is large and rigid, it may crush less sturdy mail pieces as it forces its way in, or even rupture the bag, if one is used. If a simple inserter is used, for example, a pair of fingers that grasp the mail piece and reach in with it, the problem of crushing other mail or ripping the bag still persists. Accordingly, to assure that even a thin, frail mail piece can be inserted successfully into a slot, whether a walled slot or the mouth of a bag, a system is needed that prevents contact between the mail piece being inserted and one or more mail pieces already present in the slot. The present invention provides a two-part system that addresses these difficulties. As described in detail below, such a system includes both a mechanical inserter small and thin enough to be mounted on each robot 100, and a guide frame that cooperates with the inserter to protect mail already in the slot and assure that the inserted mail enters the slot successfully. In addition, steps must be taken to prevent mail in the slot from being pulled out of the slot when the inserter withdraws, and also when the guide frame is withdrawn after sorting is completed.

The guide frame of the invention is inserted into the slots of the mail case 70 prior to sorting. Referring to FIGS. 2, 11, 12*a*–12*c*, a rectangular mail case loading rack 480 having includes a pair of vertical beams 482 spanned by five horizontal cross beams 484. Beams 484 are spaced to match the spacing of each tier of the case 70. Rack 480 is releasably secured to case 70 by suitable means, e.g., a cam lock 582 or a series of pins and grooves, or the like. A number of movable guide frames 80*a*–80*d* are mounted between each adjacent pair of cross beams 484 as described in detail hereafter. Each guide frame 80 includes a moveable rectangular frame 500, a series of partitions 502 mounted on frame 500 by means of upper and lower pin and slot connections more fully detailed hereafter, and insertion guide assemblies 550, which alternate with partitions 502. Each partition 502 and guide assembly 550 pair is designed to fit into a corresponding slot 72 when the guide frames are inserted into the mail case 70 prior to loading mail into the case 70. Each partition 502 and guide assembly 550 pair is configured to partition the case 70 shelf, thereby creating individual slots 72. Further, if bags are present, the guide walls are dimensioned to fit into corresponding bags. In a simplified embodiment, and especially where slots with fixed walls are used in case 70, it may be sufficient to omit partition 502 and use only a movable guide 550, which acts as a guide to separate the incoming mail piece from mail already in the slot. On the other hand, partitions 502 can serve as dividers, eliminating the need for fixed slot walls 71. In such a case, it would be preferable to provide the partitions with moving belts or the like as described in connection with the guides to prevent mail from coming out of the case when the partitions are withdrawn at the end of a sorting run.

In general, when the robot 100 reaches a selected slot 72 and identifies it by suitable means, such as scanning a bar coded tag associated with that slot, the robot positions an inserter 142 (FIGS. 6,) holding a mail piece into slot 72 between the partition 502 (on the left) and the guide assembly 550 (on the right as shown), avoiding direct contact between the inserter 142 and any mail already present in the slot 72, which is to one side of the inserter 142. Guide assembly 550 is then repositioned to the opposite side of inserter 142. Inserter 142 then inserts the mail piece into the slot, and inserter 142 is then retracted. According to a preferred form of the invention, the difficult task of inserting the mail piece is accomplished by moving a pair of inserter panels having the mail piece held there between into the slot, and then withdrawing the plates while leaving the mail piece behind, and without disturbing any mail previously sorted to one side of the inserter 142.

In general, when the robot reaches a selected slot 72 and identifies it by suitable means, such as scanning a bar coded tag associated with that slot, the robot positions an inserter 142 (FIG. 6) in front of slot 72, which may already contain mail pieces. The wedge shaped end of the inserter 222 is extended in between flared entry flaps 568 and 554. Guide assembly 550 prevents direct contact between the inserter 142 and any mail already present in the slot 72, which is to one side of guide 550. Guide assembly 550 is extracted and repositioned to the opposite side of inserter 142, in between inserter 142 and partition 502. Inserter 142 leaves the mail piece in the slot as inserter 142 is retracted. According to a preferred form of the invention, the difficult task of inserting the mail piece is accomplished by extracting a pair of inserter panels while holding the mail side of belts 252 and 254. This relative motion imposes a peeling action of the belts relative to and away from the mail. Once the plates are fully extracted, the mail is left behind without disturbing any mail previously sorted to one side of the inserter 142.

Once the robot 100 successfully unloads a mail piece into the selected slot 72, it returns via the rail system to the loading station 12, more specifically to the end of a queue of robots 100 awaiting loading, and receives another mail piece whereafter the process is repeated until all mail has been sorted. While computer 30 does accomplish a number of centralized functions, in particular operating the loading station, in a preferred embodiment of the invention it does not control individual robots 100 during their passage along the rail system. While such centralized control is certainly possible, such as using a wireless LAN or by transmitting signals along the rail, the simultaneous control of a very large number of robots requires elaborate software, may cause network bandwidth problems, and may increase the cost of each robot 100. Accordingly, the preferred form of the system is based on distributed control. As described in detail hereafter, each robot 100 receives a series of instructions from computer 30 after receiving a mail piece for delivery. These instructions are a bare minimum the robot needs to navigate itself from the exit side of the loading station 12 to the designated slot, for example, instructions on which switch position to actuate on its way to the destination followed by which slot to insert the mail into. For example (see FIG. 2):

| Step | Instruction |
|---|---|
| 1 | Go right at switch 68e |
| 2 | Go right at switch 68a |
| 3 | Go left at switch 68b |
| 4 | Deliver to slot #64 |

This brings the robot 100 at step 3 to the rail passing by second tier 74*b* from the top, whereupon the robot 100 uses an on board bar code scanner 122 (FIG. 3) to find the designated slot number. Once the robot 100 has completed its delivery the rail system contains a series of merges that bring it back to the loading station once again. Collisions are prevented by simple proximity detection, i.e., each robot stops when within a certain distance of the robot ahead of it on the rail, and resumes travel only when the robot ahead of it is no longer detected. In this manner the controller 120, in the simplest embodiment, needs to be able to make a limited number of yes or no decisions during its travel. Other control schemes could of course be employed, although less advantageous, for example, one which moves the control functions off the robots and onto the track around which the robots move. Control can of course be centralized, wherein each robot does nothing more than respond to remote instructions sent to it through a wireless network or along the rail.

Figure 3:
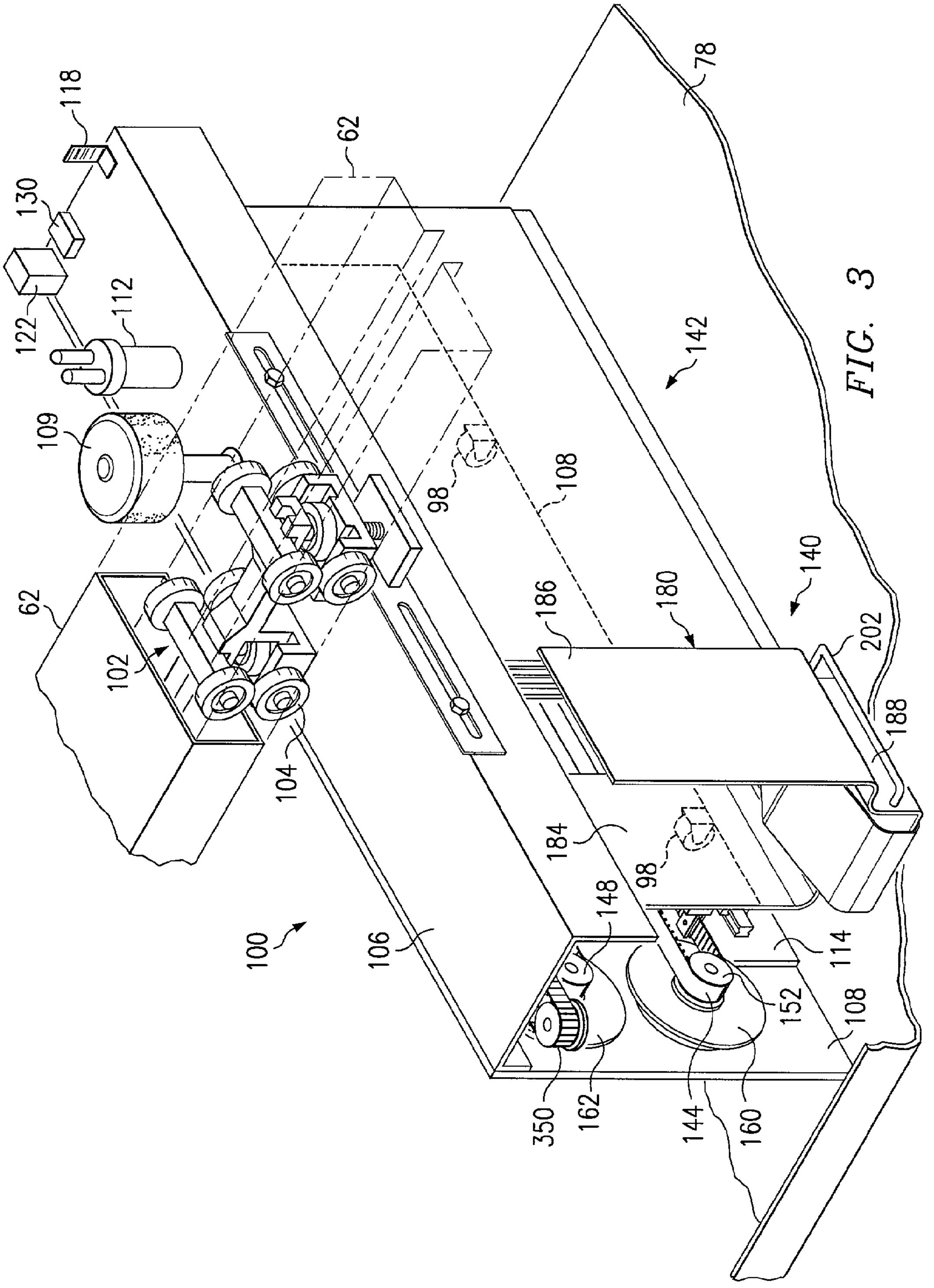
FIG. 3 is a partial perspective view of a robot for use in the mail handling system of FIG. 1 with certain features omitted for the purpose of illustration.
Figure 6:
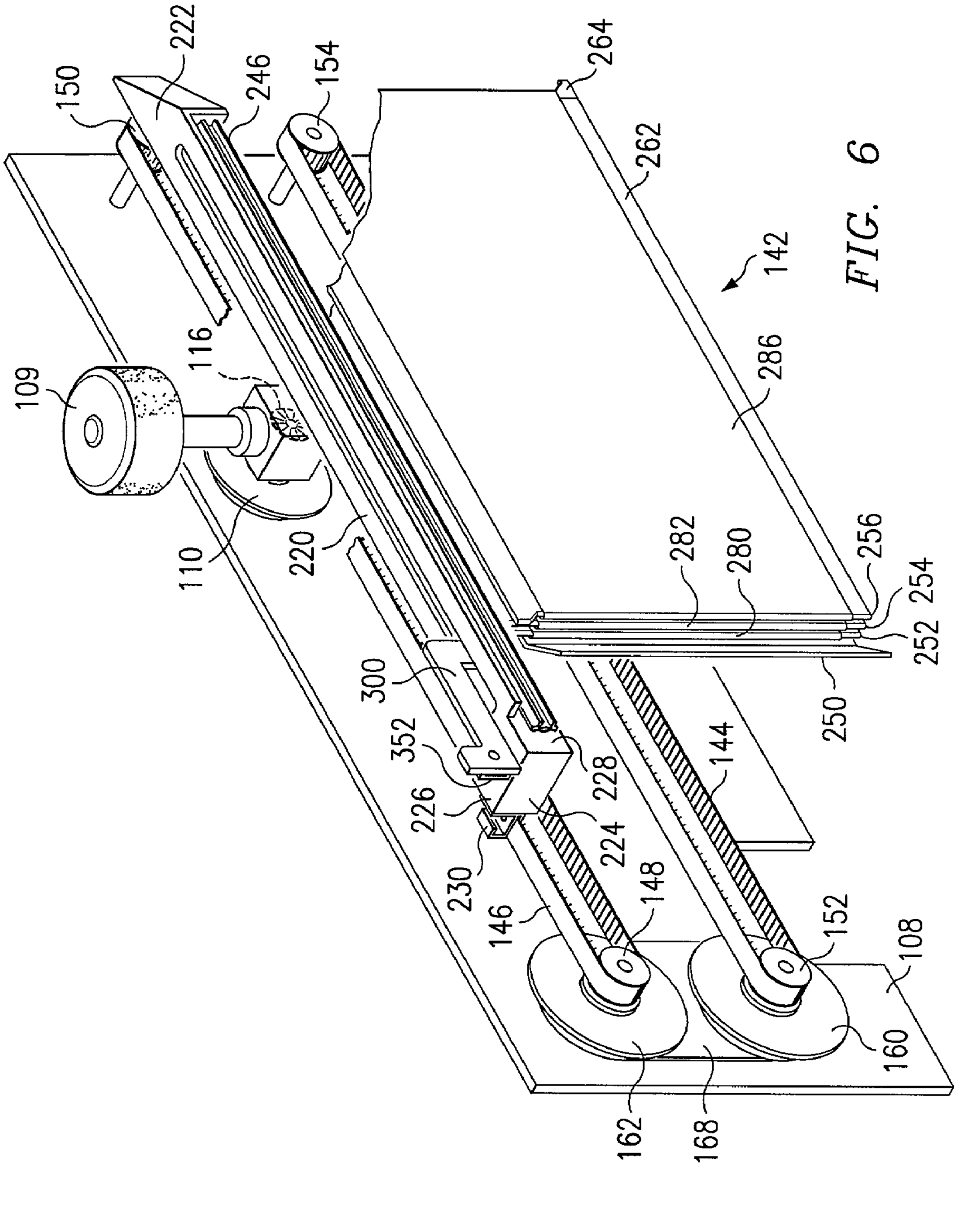
FIG. 6 is a partial perspective view of an inserter mechanism of the robot of FIG. 3 illustrating a plate assembly including a guide plate, inserter plates and a stripper plate.

The following is a detailed example of a robot and guide system capable of accomplishing the foregoing preferred form of the invention. Referring now to FIGS. 3, 6 and 10, robot 100 includes a trolley carriage assembly 102 mounted on a rigid carrier frame 106 in the shape of an inverted J (FIG. 3). As illustrated, carriage assembly 102 includes a plurality of wheels 104 mounted on a trolley carriage 102 at the top of frame 106 support robot 100 from rail 62. A traction drive motor 110 (FIG. 6) mounted on carrier frame 106 drives a traction wheel 109 that engages rail 62 to move the robot along the rail. Drive motor 110 is preferably a variable speed DC motor that is receives power through a shoe 112 that engages a power rail 64 positioned adjacent and parallel to rail 62. Robot 100 also carries an on board battery 114 that supplies power for maintaining the memory of onboard controller 120, and potentially travel drive motor 110 and other electrically powered components, when shoe 112 is not in contact with rail 64.

Motor 110 may be equipped with an encoder 116 that registers the revolutions turned by the motor and transmits a signal to an onboard microprocessor 120, which uses the encoder signal to measure movement of the robot 100 along rail 62. Encoders such as encoder 116 are well known devices routinely used for control functions and are typically positioned inside the motor housing. The encoder can be used to measure cumulative wear on each robot 100 for purposes of determining when maintenance is needed. Controller 120 can be programmed to direct the robot 100 to a side rail for servicing after the distance traveled exceeds a preprogrammed amount. Robot 100 is also provided with a set of lower support wheels 98, mounted on the lower edge of a long side wall 108 of carrier frame 106, that engage shelf 78 to support and stabilize robot 100 during loading and unloading operations.

Robot 100 is equipped with a bar code reader 122 for reading bar coded tags or signs 66 positioned along track system 60. Bar code reader 122 is mounted on carrier frame 106 at a location to facilitate scanning tags 66, at the switches (66*a*, 66*b*, FIG. 1), on the inserter guides (66*c*, FIG. 12A), and at the loading station (66*d*, FIG. 10). Signals from bar code reader 122 are input to microprocessor 120, which operates a switch or other device associated the tag 66 according to its programmed destination instructions.

As shown in FIG. 10, to enable microprocessor 120 of robot 100 to communicate with central computer 30 and other external devices, such as remotely actuated track switches 68, robot 100 is equipped with a transmitter/receiver unit 130 mounted on one end (the front) of robot 100. In a preferred embodiment, transmitter/receiver unit 130 is an infrared unit which communicates with stationary infrared transmitter/receiver units 132 positioned adjacent the path of the robot as it travels along rail system 60. Thus, for example, as robot 100 approaches a switch 68, the robot will first detect and read a bar coded tag 66, indicating the presence of the switch in front of the robot. Microprocessor 120, utilizing its preprogrammed instructions, will send a signal using transmitter/receiver unit 130 which will move the switch 68 to the correct position, if not already in that position. Robot 100 may also be configured to communicate with computer 30 over a communication rail (not shown), positioned adjacent rail 62 through a second shoe mounted on robot 100. Such a communications rail can be used in extraordinary situations where a problem has arisen and controller 120 needs to send an error message to computer 30 from wherever robot 100 might be.

Referring to FIGS. 4–8, in order to receive and unload mail pieces, robot 100 is provided with an extractor unit 140 and an inserter unit 142 that are each driven by a timing-type drive belts 144, 146, respectively, that pass around sprockets 148, 150 and 152, 154, mounted on side wall 108 of carrier frame 106. Inserter unit 142 carries a mail piece as the robot 100 travels along the rail system and inserts it into the slot when the correct slot is reached. Extractor 130 moves the inside guide plate once the insertion has been made, but before inserter 142 withdraws from the slot. An extractor drive motor 160 and an inserter drive motor 162, each of which are controlled by onboard controller 120, are mounted on a bracket 168 to drive sprockets 148 and 152 and belts 144 and 146, respectively, to extend and retract extractor 140 and inserter 142. Preferably, each of motors 160 and 162 are reversible, variable speed DC motors that optionally equipped with encoders connected to controller 120. Controller 120 can use the encoder signals to control the movement of extractor unit 140 and inserter unit 142, or such movement can be controlled by means of limit switches.

Figure 4:
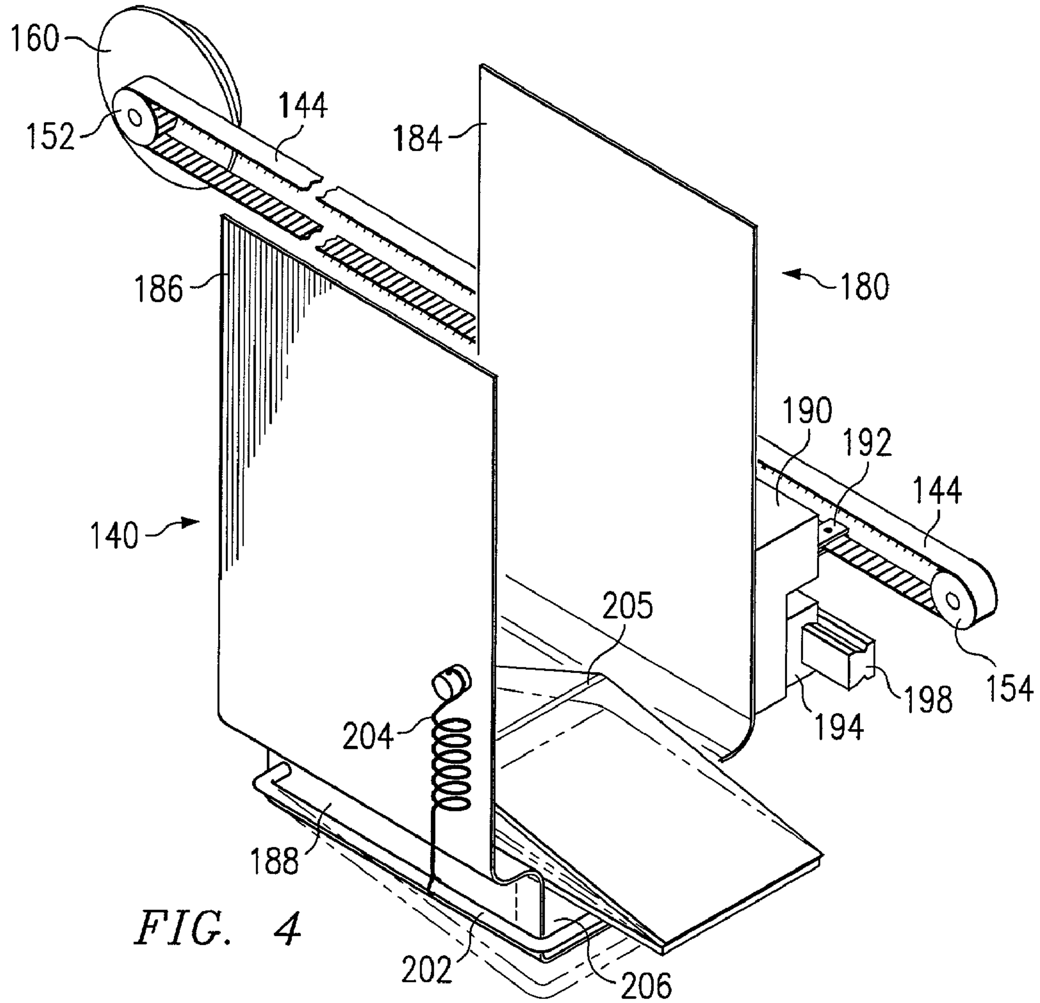
FIG. 4 is a partial perspective view of an extractor mechanism of the robot of FIG. 3.
Figure 5:
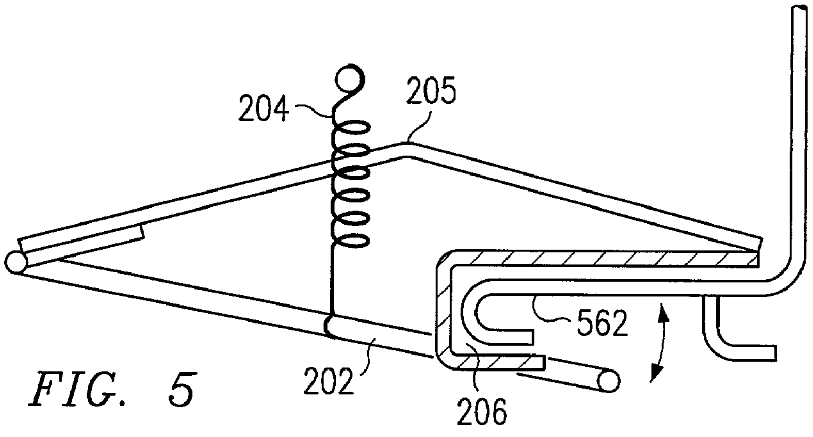
FIG. 5 is a sectional view of a latch assembly of the extractor mechanism of FIG. 4.
Figure 7:
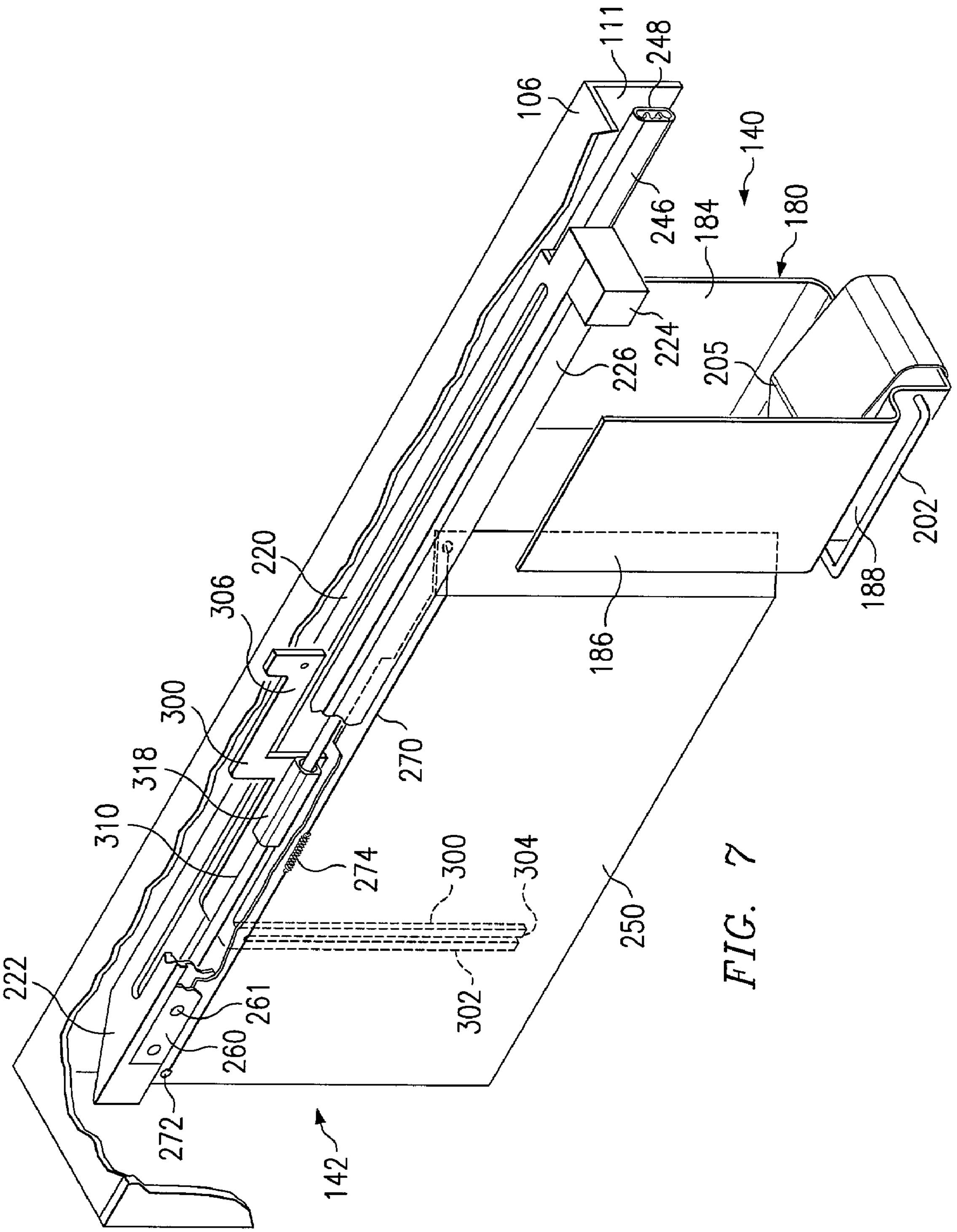
FIG. 7 is a partial perspective view of the extractor and inserter mechanisms of FIG. 6 with portions cut away for the purpose of illustration.

As best illustrated in FIGS. 4, 5 and 7, extractor 140 includes a generally C-shaped frame 180 including side walls 184, 186, a bottom wall 188, a connecting block 190 mounted on the outside surface of side wall 184 and a belt clamp 192 mounted on block 190 for connecting the extractor to drive belt 144. A rail slide 194 mounted on the outside of block 190 (FIG. 4), engages a slide rail 198 mounted on side wall 108 of frame 106 to guide extractor frame 180 as it is extended and retracted by drive belt 144. A U-shaped latch bar 202, pivotally mounted at lower rear corners of side walls 184 and 186, extends outwardly from the frame 180 and is biased in an upward direction with a spring 204. As described hereafter, latch bar 202 is positioned to catch a hook 562 (FIG. 12A) of a guide frame 80 during the unloading operation.

Figure 8:
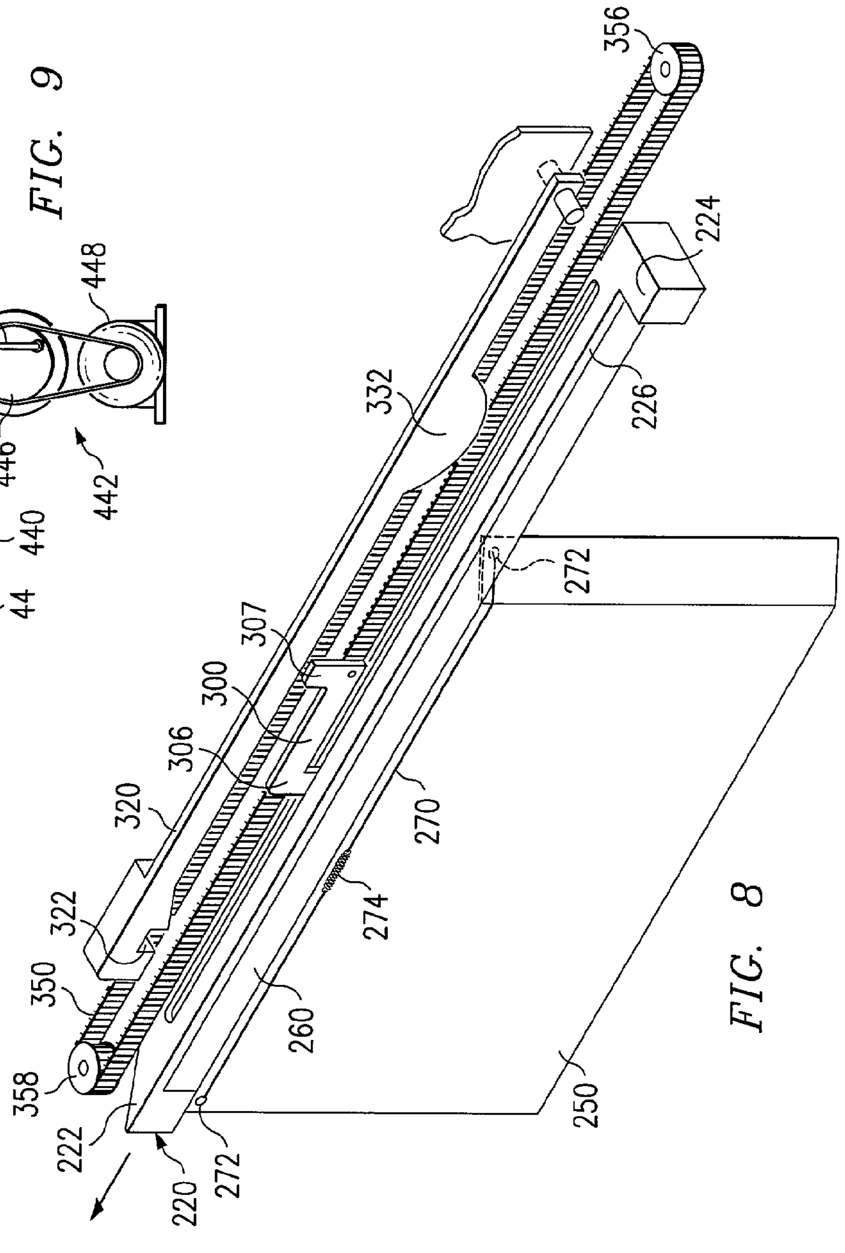
FIG. 8 is another partial perspective view of the inserter mechanism of FIG. 6 with certain components omitted for the purpose of illustration.

Referring now to FIGS. 6–8, inserter 142 can be viewed from the right (in FIG. 6) and from the left in FIGS. 7 and 8. Inserter 142 includes an inserter bar 220 with a wedge-shaped outboard (leading) end 222 to facilitate insertion of the inserter into a slot 72 of a mail case 70. As used herein the term "outboard" refers to the direction traveled by inserter bar 220 as it is extended outwardly from robot 100. Bar 220 acts as a frame from which the mail holding and inserting components of the device are suspended. A drive block 224 is mounted on an outer side 226 of bar 220 near the inboard end of the bar. Drive block 224 is clamped onto inserter drive belt 146 with a belt clamp 230, connecting inserter bar 220 to drive belt 146. A slide rail 246 is mounted on an inner side 228 of inserter bar 220, opposite drive block 224. Slide rail 246 in turn is slidably engaged in a stationary rail 248 mounted on short side wall 111 of carrier frame 106. Thus, to extend or retract inserter bar 220, microprocessor 120 engages motor 162, driving belt 146 which carries drive block 224 and inserter bar 220 in the desired direction. As the inserter bar 220 is extended or retracted, telescoping slide rail 246 travels along stationary rail 248, supporting and guiding extractor bar 220.

Reliably receiving and discharging flat elongated items having variable dimensions and differing degrees of stiffness from a traveling transfer device such as robot 100 presents a number of challenges. A device designed to receive and discharge such items must be configured to receive items having a substantial range of widths, heights and thicknesses. In the case of mail pieces, the device must be capable of handling relatively heavy, thick and stiff items such as large envelopes, magazines and similar items. Alternatively, the device must also be capable of receiving flimsy single-sheets that are highly flexible, difficult to reliably engage, transfer and hold and are easily crumpled or damaged. Further, it is desirable that such items be received and discharged on the same side of the transfer device to facilitate equipment placement and reduce the footprint of the transfer system.

Turning now to FIGS. 6–8 and 14*a*, to overcome the foregoing difficulties in accordance with the invention, inserter 142 includes a series of thin parallel plates oriented vertically beneath bar 220, including an outer guide plate 250, inner inserter plates 252 and 254, and an outer stripper plate 256 on the side opposite plate 250. Plates 250–256 are preferable formed from a lightweight, relatively rigid plastic sheet material having a limited degree of flexibility. Guide plate 250 is clamped onto inserter bar 220 (FIG. 7) by means of a flat flange 260 fastened to the side of inserter bar by screws 261. Inserter plates 252, 254 and stripper plate 256 are mounted or hung onto guide plate 250 and inserter bar 220 with a cable 270 (FIG. 8) that extends through eyelets 272 in the upper corners of plates 250–256. Cable 270 is tensioned with a spring 274 allowing inserter plates 252, 254 to move in a horizontal direction relative to each other to accommodate mail pieces of varying thickness received between the plates. This mounting arrangement also allows the lower edges of plates 250–256 to pivot outwardly within a limited range of movement. Guide plate 250 has an inwardly angled lip 266 (FIG. 14*a*) that extends slightly beyond plates 252–256 to facilitate insertion of inserter 142 into a guide frame 80 set in a slot 72 as described hereafter.

Figure 12A:
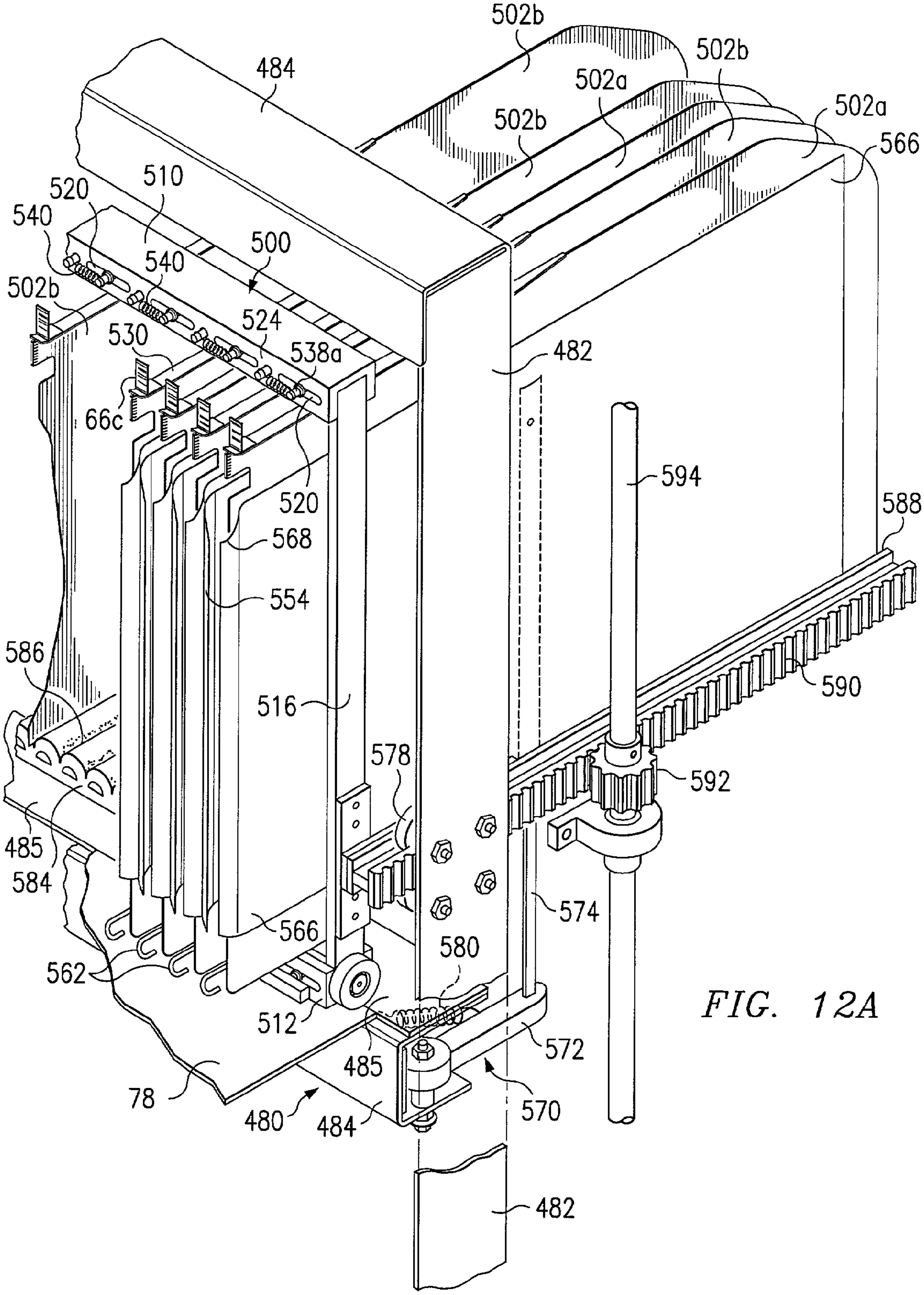
FIG. 12*a* is partial perspective view of a guide frame of FIG. 11.

The lower edge of the stripper plate 256 (FIG. 13A) engages ramped surface 205 of the extractor 140, thus actuating latch bar 202 of extractor 140 to move the bar into position to engage latch hook 562 (FIG. 12*a*). Stripper plate 256 also has a pair of upper and lower spreader extensions 264, which extend from the front edge of plate 256 (FIG. 10) and allow the stripper plate to be engaged and moved away from inserter plate 254 by a paddle 432 during the loading operation.

Figure 14A:
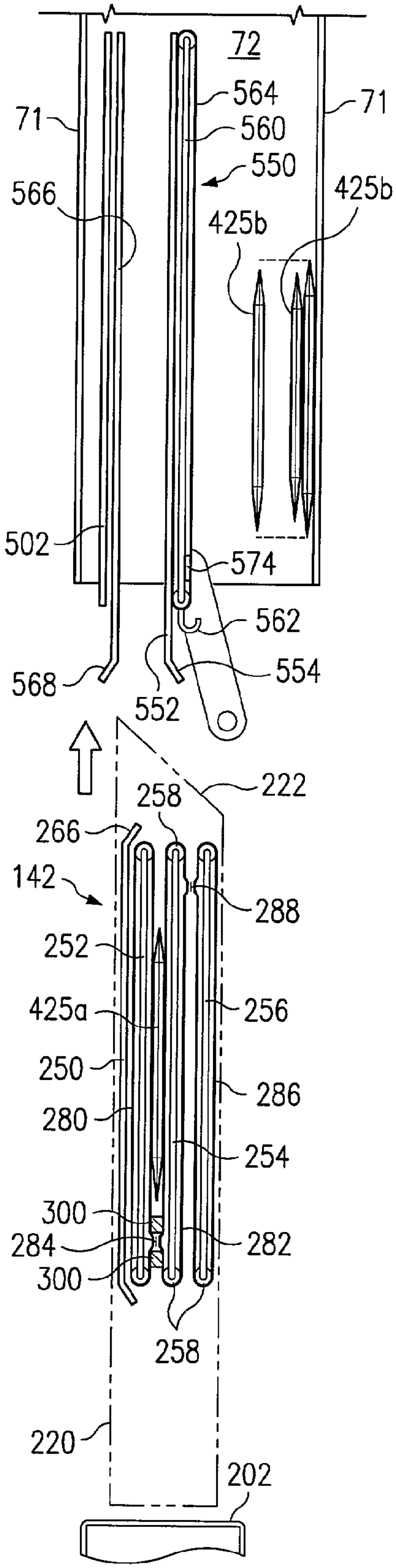
FIGS. 14*a*–14*f* are schematic partial top views of the plates and belt assemblies of the inserter mechanism of FIG. 6 and guide assembly of FIG. 12*b* corresponding to FIGS. 13*a*–13*f*, illustrating the positions of the assemblies at various stages as a mail piece is unloaded into a mail case.

As illustrated in FIG. 14*a*, extending continuously around inserter plates 252 and 254 are fabric inserter belts 280, 282 that form horizontal loops about the mid sections of plates 252, 254. Belts 280, 282 are preferably formed from a strong, lightweight material with a low coefficient of friction, such as a nylon or polyester fabric. Belts 280 and 282 are connected by a web 284 that extends from the lower edge to the upper edge of each of belts 280, 282 that is preferably made from the same fabric as the belts. Inserter belts 280, 282, along with web 284 form an H-shaped belt configuration for receiving a mail piece 425*a* between belts 280 and 282 from the outboard side of web 284. A stripper belt 286, similar to inserter belts 280 and 282, extends continuously around stripper plate 256 and is connected to inserter belt 282 by a web 288 that extends from the lower edges to the upper edges of belts 282, 286. Inserter plates 252, 254 and stripper plate 256 may be provided with vertical end rollers 258 to reduce friction and wear on belts 282, 284 and 286 as the belts slide around the plates.

As illustrated in FIG. 14*a*, inserter belts 280, 282 and stripper belt 286 are each configured to slide freely in either direction (clockwise or counterclockwise) reciprocating between the ends of plates 252, 254 and 256 as constrained by webs 284 and 288. Movement of web 284 between plates 252, 254 causes web 288 to move in the opposite direction between plates 254, 256, causing stripper belt 286 to simultaneously slide on stripper plate 256. In the mail holding position shown in FIG. 14*a*, web 284 is in its rearmost position and web 288 is offset from it, in its frontmost position. By means of webs 284, 288, movement of belts 280, 282 and 286 around inserter plates 252, 254 and stripper plate 256 is controlled by a single belt drive post 300.

As best illustrated in FIGS. 7 and 10, belt post 300 extends from a lower end 304 adjacent the lower edge of web 284 upwardly adjacent carrier frame 106. Lower end 204 may be split to provide a open ended slot 302 configured to engage corresponding pockets in web 284. An upper end portion 306 of belt post 300 is connected to a non-powered double-side timing belt 350 that is used during the loading operation. As illustrated, belt post 300 extends horizontally in an inboard direction from the top of web 284 and is connected on one side to a belt post slide 318 mounted on q slide bar 310 (FIG. 7). Slide bar 310 is mounted beneath bar 220. Opposite ends of bar 310 are mounted to opposing end walls of bar 220, which is U-shaped in cross-section. Belt post slide 318 is preferably a barrel-type bushing configured to guide belt post 300 along slide bar 310.

Figure 13A:
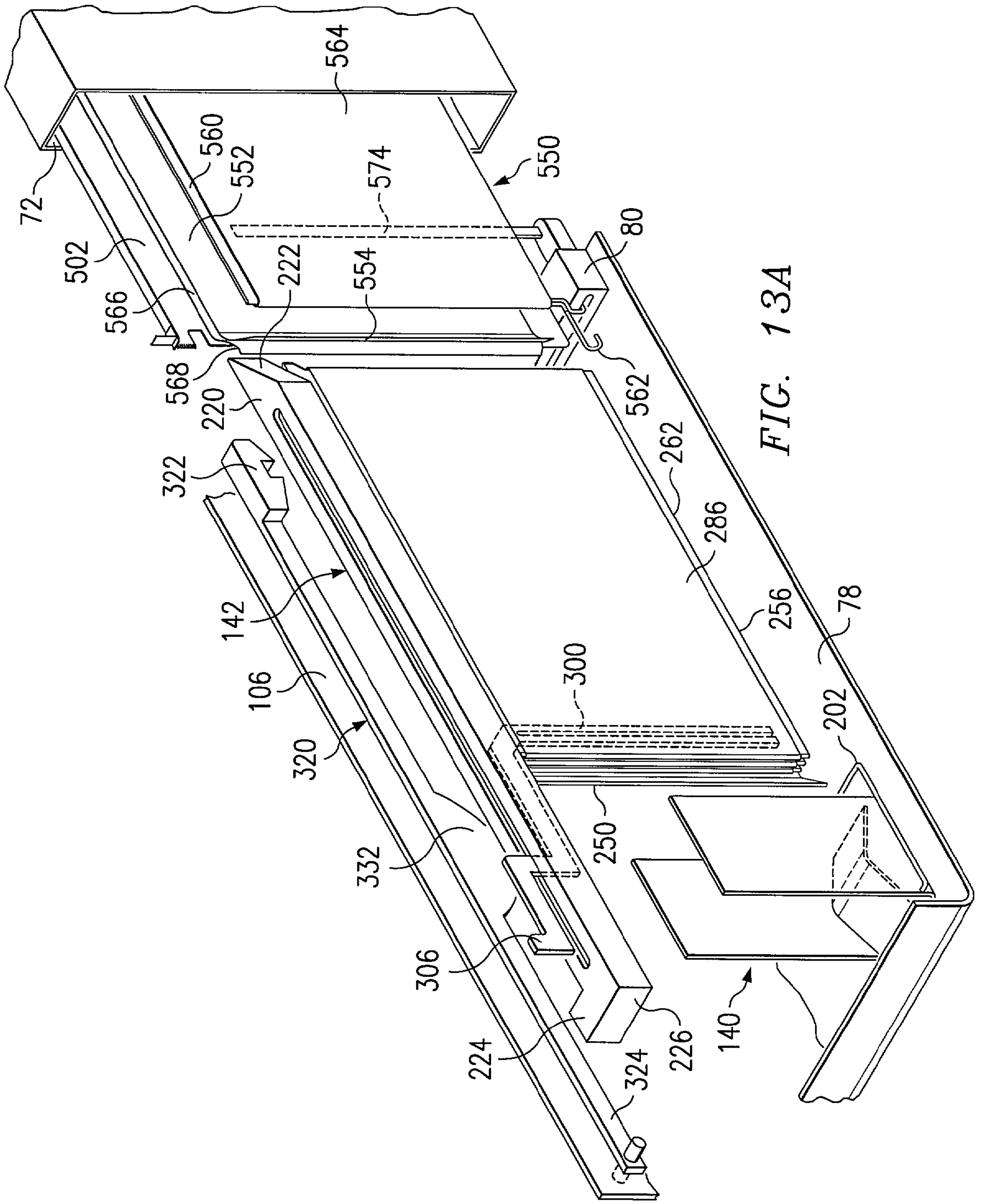
FIGS. 13*a*–13*f* are perspective views of the extractor and inserter mechanisms of FIGS. 4 and 6 depicting the mechanisms at various stages as a mail piece is unloaded into a mail case.

As best illustrated in FIGS. 10 and 13*a*, a latch bar 320 pivotally mounted at its rear (inboard) end to carrier frame 106 at a pivot 321. Latch bar 320 is positioned above and parallel to slide bar 310. Latch bar 320 is downwardly biased with its own weight such that a post hook 322 formed at the outboard end 330 of the block bar will engage the upper end tab 307 of belt post 300 when the post moves under the bar, latching the post in position relative to robot 100. Latch bar 320 also includes a cam surface 332 extending from the bar that is positioned and configured to be engaged by drive block 224 when the block passes the cam surface to pivot the bar, releasing belt post 300 and allowing post slide 318 to move along slide bar 310.

Turning to FIG. 10, the upper end 306 of belt post 300 extends further upwardly through a slot 301 in bar 220 and ends in a tab 307. Tab 307 is fastened with a belt clamp 352 to a non-powered double-sided timing belt 350 that passes around a pair of front and rear sprockets 356 and 358 mounted on the underside of frame 106 in a linear path extending parallel to and directly above slide bar 310 and inserter bar 220. Movement of belt 350 drives post slide 318 and belt post 300 along slide bar 310. Belt 350 is positioned so as to engage a corresponding powered double-sided timing belt 420 at loading station 12 so as to engage and drive belt post 300 along slide bar 310.

Referring again to FIG. 1, a permanently mounted bar code reader 400 and infrared transmitter/receiver 132*a* are positioned adjacent to incoming robot track 60*e* at the entrance to loading station 12. As each robot 100 approaches the loading station 12, bar code reader 400 scans an identification tag 118 positioned on the robot and transmits the identity of the robot to central computer 30. As the robot 100 proceeds further, it passes infrared/transmitter receiver 132*a*, at which time microprocessor 120 uses onboard transmitter/receiver 130 to report the robot's status and any exception data that controller 120 has been programmed to track to central computer 30 before the robot 100 is loaded with a mail piece for delivery.

As best illustrated in FIG. 10, loading station 12 is equipped with an overhead conveyor that is preferably an endless chain or belt type conveyor 410 with a plurality of spaced apart cogs 412 configured to engage trolley carriage 102 of robot 100. Conveyor 410 is driven with a motor 414 equipped with an encoder that communicates with central computer 30 to the computer 30 to control the travel of the conveyor. As a robot 100 approaches loading conveyors 42, 44, the robot reaches a gap in power rail 64 where one of cogs 412 engages trolley carriage 102, pushing the robot through loading station 12 under the control of computer 30. Motor 110 is de-energized and traction wheel 109 no longer drives robot 100.

In a first mode of operation, conveyor 410 moves or indexes robot 100 into alignment with second unloading conveyor 44 and stops with inserter 142 positioned such that a mail piece 425 conveyed by the second loading conveyor 44 will be aligned between inserter plates 252, 254 and inserter belts 280, 282 of the robot 100. Bar code reader 122 and/or a proximity switch or similar sensor 416, mounted adjacent to second loading conveyor 44 may be used in addition to the signal from the encoder of motor 414 to signal central computer 30, confirming that robot 100 is in position for loading.

As robot 100 moves into loading position, double-sided timing belt 350 of robot 100 moves into engagement with a corresponding powered double-sided timing belt 420 that is mounted adjacent to the path of robot 100. Powered double-sided timing belt 420 is conventionally driven with a motor 422 operated under control of central computer 30. Motor 422 is also provided with an encoder connected to computer 30, enabling computer 30 to monitor the speed of belt 420 and distance belt 420 travels when actuated.

Figure 10A:
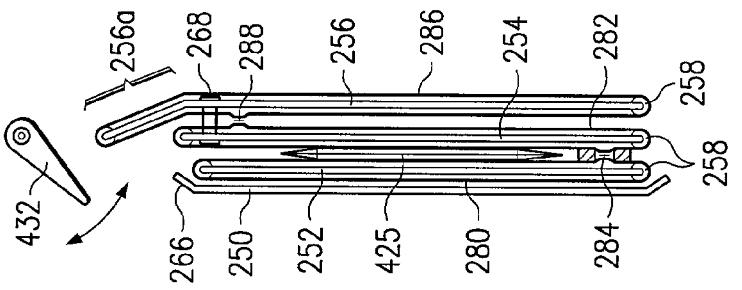
FIG. 10*a* is a partial top view of the inserter of FIG. 6 showing an alternative configuration of the guide, inserter and stripper plates.
Figure 10:
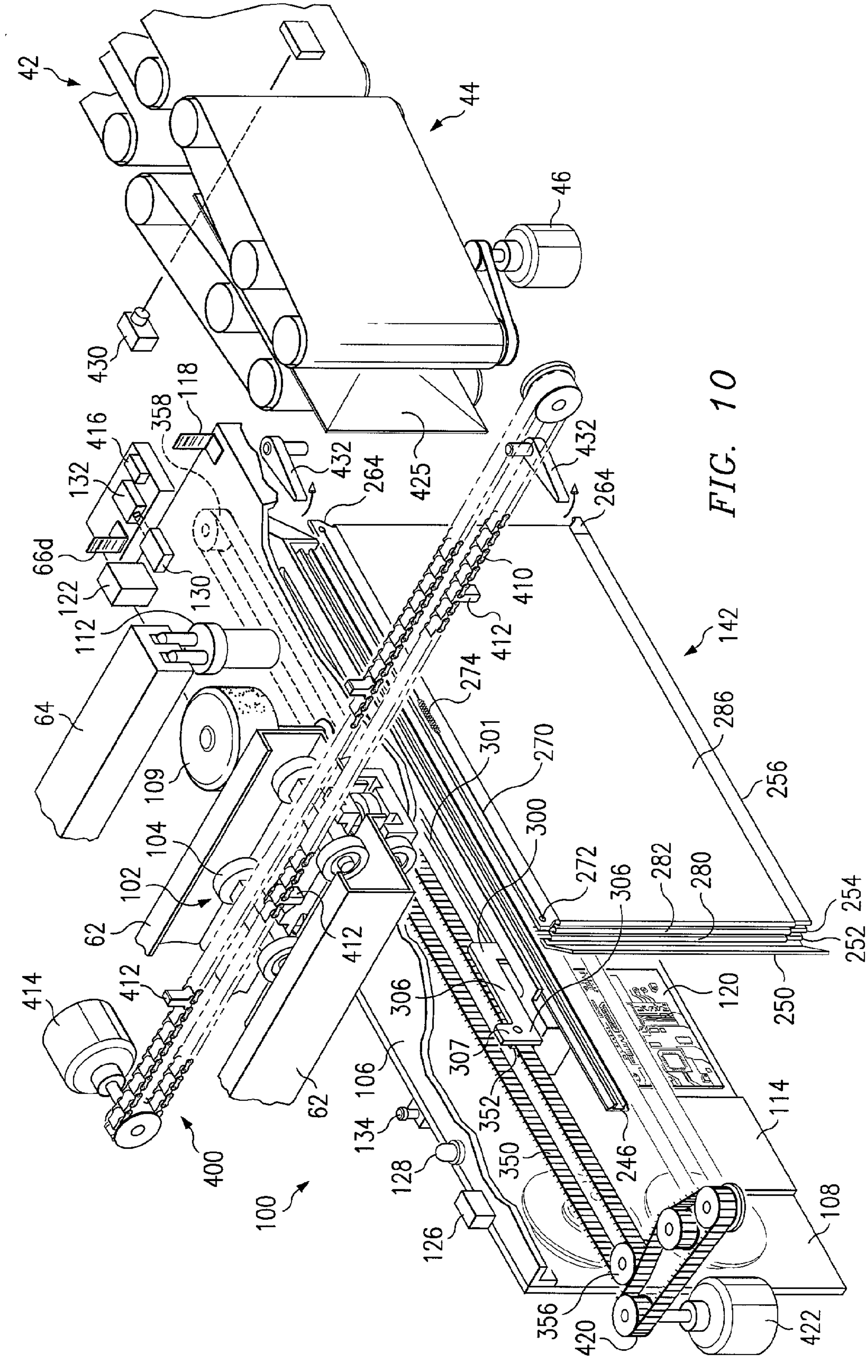
FIG. 10 is a perspective view of a loading station of the mail sorting and handling system of FIG. 1, with a robot of the invention positioned to receive a mail piece with various components cut away or omitted for the purpose of illustration.

As illustrated in FIGS. 10 and 10*a*, when robot 100 is in position for loading, solenoid actuated, upper and lower spreader arms or paddles 432, mounted adjacent second unloading conveyor 44, are actuated to engage and push extensions 264 of stripper plate 256 outwardly, away from the adjacent plate 254. Since inserter plates 252, 254 and stripper plate 256 are connected through belts 280, 282 and 286 and webs 284, 288 (FIG. 14*a*) the stripper and inserter plates spread in an accordion-like manner as arm 432 engages stripper plate 256, widening the front opening and facilitating the insertion of a mail piece between inserter plates 252 and 254. Additionally, as shown in FIG. 10*a*, the upper and/or lower outboard corners of plates 254 and 256 are connected above and/or below belts 282 and 286 with a screw, rivet or similar fastener 268, to ensure that plate 254 moves outwardly when plate 256 moves outwardly. In the alternative embodiment illustrated in FIG. 10*a*, extensions 264 of FIG. 10 are replaced with an angled extension 256*a* of stripper plate 256. Angled extension 256 not only provides a surface for arms 432 to engage, but also serves as an additional guide surface (along with lip 266) when inserter 142 is extended into a slot 72 during the unloading process as hereinafter described.

Referring again to FIG. 10, with robot 100 in position for loading, a mail piece 425 is conveyed from first loading conveyor 42 to second loading conveyor 44. First loading conveyor 42 is operated at a single speed and mail pieces are loaded onto the conveyor at a rate approximately equal to or slightly less than the rate at which robots 100 can be queued or indexed into the loading station and positioned for loading. Second loading conveyor 44 is driven with a variable speed motor 46 including an encoder which communicates the speed of the motor to computer 30, enabling computer 30 to adjust the linear velocity of second unloading conveyor 44. When empty, second loading conveyor 44 is operated at a velocity matching the velocity of first loading conveyor 42 so as to receive mail pieces from first loading conveyor 42 without bending or damaging the mail pieces.

A detector, preferably a photocell 430, is positioned to detect the leading edge of the mail piece as it passes through a small gap between first and second loading conveyors 42, 44. When detector 430 senses the leading edge of the mail piece, it signals computer 30 which in turn decelerates conveyor 44 to a selected linear velocity matching the speed at which inserter belts 280, 282 will be operated to receive mail piece 425. Simultaneously, or with a small, preprogrammed delay, computer 30 engages motor 422 to drive belt 420 which in turn drives belt 350, carrying belt post 300 in an inboard (rearward) direction. As belt post 300 moves rearward, web 284 moves with it, causing inserter belts 280 and 282 to slide around inserter plates 252, 254 such that mail piece 425 is received and captured between the belts (left belt 280 clockwise, right belt 282 counterclockwise). Ideally there is no relative motion between the mail piece and the H-belt. Computer 30, using the signal from photocell 430, may delay or adjust the time at which it engages motor 422 such that inserter belts 280, 282 begin to move just as the leading edge of the mail piece 425 reaches inserter 142. Since inserter plates are held in position with cable 270 and spring 274, plates 252 and 254 can move laterally to accommodate mail pieces of varying thickness.

Computer 30, utilizing the signals from the encoders associated with motors 46 and 422, synchronizes the velocity of second loading conveyor 44 with the velocity of inserter belts 280, 282 as the mail piece 425 is transferred from conveyor 44 to inserter 142. Since second loading conveyor 44 and belts 280, 282 are driven at the same, or approximately the same, linear velocity, mail piece 425 is not subjected to longitudinal forces that would tend to cause the mail piece to buckle or bend as it is transferred from conveyor 44 to inserter 142. This feature allows mail-handling system 10 to process flimsy mail pieces such as thin single sheets that would otherwise be damaged or jam the system. This feature also provides a means of decelerating heavy mail pieces in a manner that avoids damaging the mail piece or the mechanism. While as described, the synchronization of conveyor 44 with inserter belts 280, 282 is accomplished by computer 30, it will be appreciated that the function may be accomplished with a variety of sensors and motor control devices known to those of skill in the art and all of which are specifically contemplated to be within the scope of the invention.

After a calculated or preprogrammed time interval sufficient to allow inserter belts 280, 282 to travel sufficiently to fully engage and capture mail piece 425 as illustrated in FIG. 14*a*, computer 30 disengages motor 420. Alternatively, computer 30 may utilize the input signal from the encoder associated with motor 420 to determine when the mail piece has been fully captured between inserter belts 280, 282. Computer 30 then de-actuates spreader arms 432, releasing extensions 264 (or extension 256*a*) of stripper plate 256. Conveyor 410, under the control of computer 30, then engages robot 100, moving the robot out of the loading station and indexing the next robot into position for loading.

Figure 9:
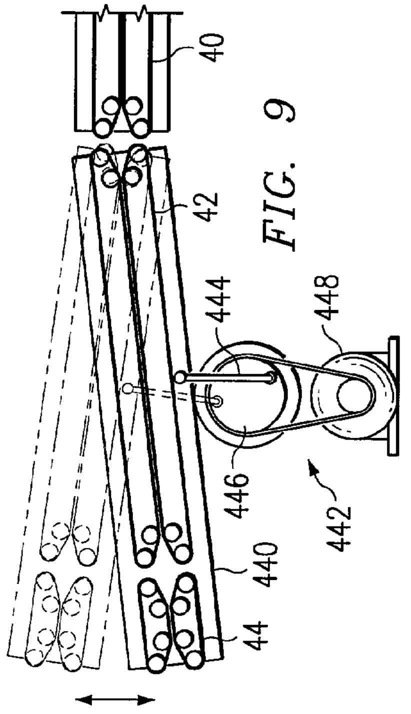
FIG. 9 is a schematic illustration of an articulating mechanism for use with the feed conveyors of the mail sorting and handling system of FIG. 1.

In a second mode of operation, robot 100 continues to travel during the entire loading process. Referring now to FIG. 9, first and second loading conveyors 42, 44, and the associated drives, sensors and controls are mounted on a moveable support frame 440 which is pivotable around the receiving end of first loading conveyor 42. Support frame 440 is connected to a reciprocating drive apparatus 442 including a reciprocating arm 444 connected to a cam 446 driven with a conventional motor 448 under the control of computer 30. In this mode, as conveyor 400 pushes robot through loading station 12, computer 30 activates motor 448 to pivot support frame 440 such that second loading conveyor 44 moves at a linear velocity in the direction of travel of conveyor 400 that matches the velocity of robot 100 for a period sufficient to complete the loading process as previously described. Mail piece 425 is transferred from the second loading conveyor 44 to inserter 142 in the same manner as described above except that the transfer is accomplished while robot 100 is traveling. Belt 420 and motor 422 may be modified in size to cover the full range of movement of conveyor 44, or may be to movable frame 440 in a manner that does not obstruct the movement of robots 100. Although as illustrated, a reciprocating drive apparatus 442 is used to move support frame 440, it will be appreciated that other means may be employed to move frame 440 in a horizontal direction. For example, it is contemplated that a rack and pinion drive, a chain or belt drive or hydraulic or pneumatic cylinder may be employed in place of reciprocating drive 442. After mail piece 425 is loaded onto robot 100, conveyor 410 conveys robot 100 from loading station 12 to a location where shoe 46 re-engages power rail 64. Simultaneously, cog 412 disengages from trolley carriage 102, and robot 100 proceeds under its own power to outgoing track tower 50.

Referring again to FIGS. 1 and 2, as robot 100 approaches first switch 68*e* and outgoing track tower 50, onboard bar code reader 122 detects and reads a switch identification tag 66*e*. There are similar additional tags 66 and stationary transmitter/receivers 132 (not all shown) at each of the other switches along the rail system. Controller 120 then queries computer 30 using onboard transmitter/receiver 130 and stationary transmitter/receiver 132*e* to obtain destination instructions for mail piece 425 that will guide robot 100 to the correct slot. These instructions could also be given at the time of loading by means of the stationary transmitter/receiver 132 shown in FIG. 10, but it may be desirable to delay this step for the length of time it takes robot 100 to leave the loading station and reach stationary transmitter/receiver 132*e*. This allows more time for resolving address data on the mail piece before its destination is determined. Computer 30 responds to the query with destination instructions corresponding to a selected slot 72 in mail case 70 that has been assigned by computer 30 to receive the mail piece. Controller 120, using onboard transmitter/receiver 130 to communicate with the selected switch though a further transmitter/receiver unit 132*b* and subsequent ones, directs the selected switch to move into position so robot 100 may proceed along one of vertically aligned tracks 60*a*, 60*b*, 60*c* to the selected guide frame 80 and slot 72. Alternatively, robot 100 passes through switches 68*a*–68*c* and proceeds along track section 60*d* to the selected guide frame and slot.

As illustrated in FIG. 2, a plurality of mail cases 70 are positioned along delivery loops or tracks 60*a*, 60*b*, 60*c* or 60*d* to receive mail from robots 100. In the illustrated embodiment, each of mail cases 70 comprises four vertically arranged tiers 74*a*, 74*b*, 74*c* and 74*d* of slots 72 for receiving mail pieces destined for a particular location or address. Each of mail cases 70 is secured to a rectangular mail case loading rack 480. Rack 480 has a pair of vertical beams 482 spanned by several horizontal beams 484. A cam lock 582 or similar device is used to lock rack 480 in alignment with case 70, so that beams 482 are positioned between tiers 74*a*–74*d*.

Figure 11:
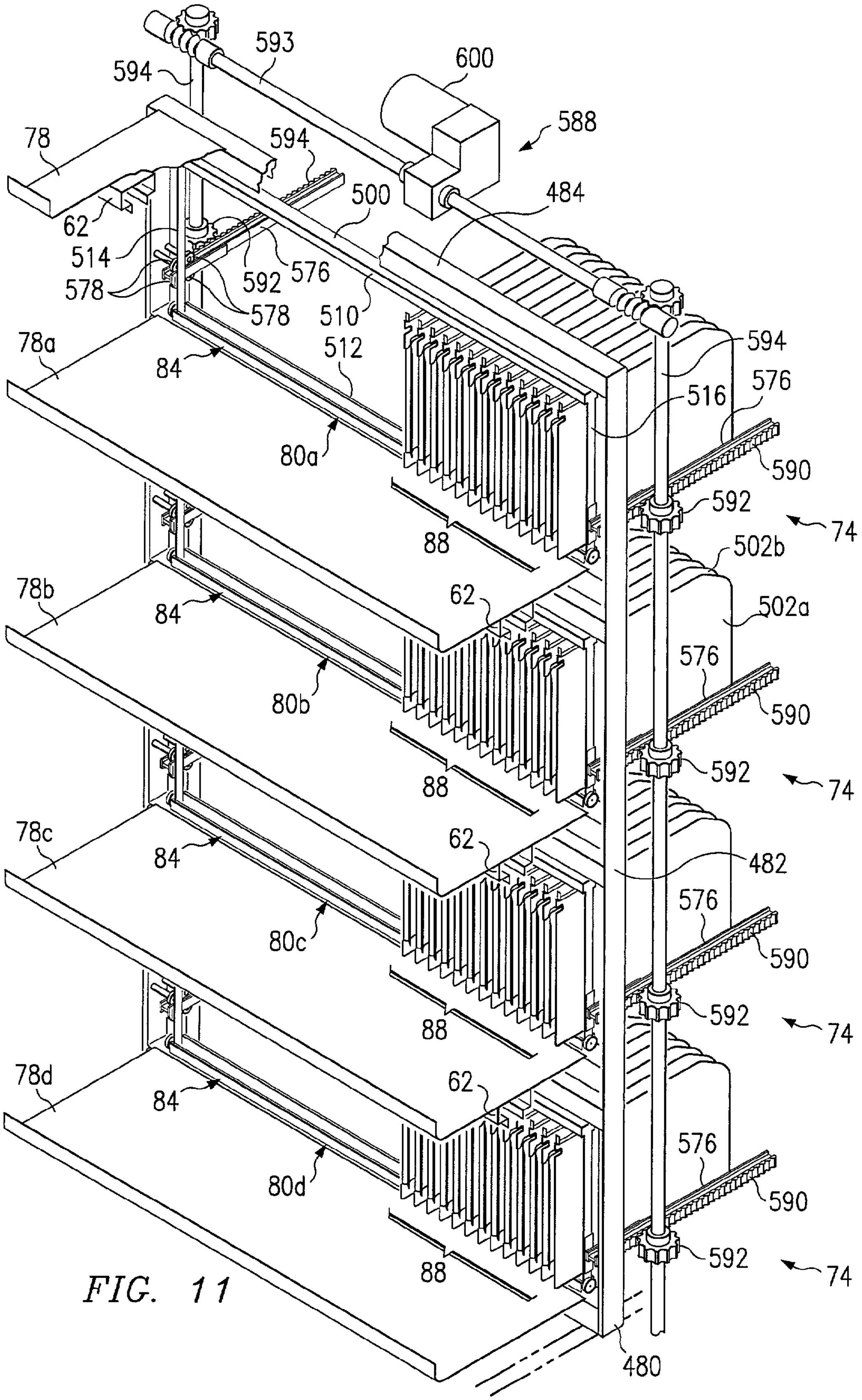
FIG. 11 is a perspective view of a mail loading rack with a plurality of guide frames and a drive frame assembly for use in the mail sorting and handling system of FIG. 1.
Figure 12B:
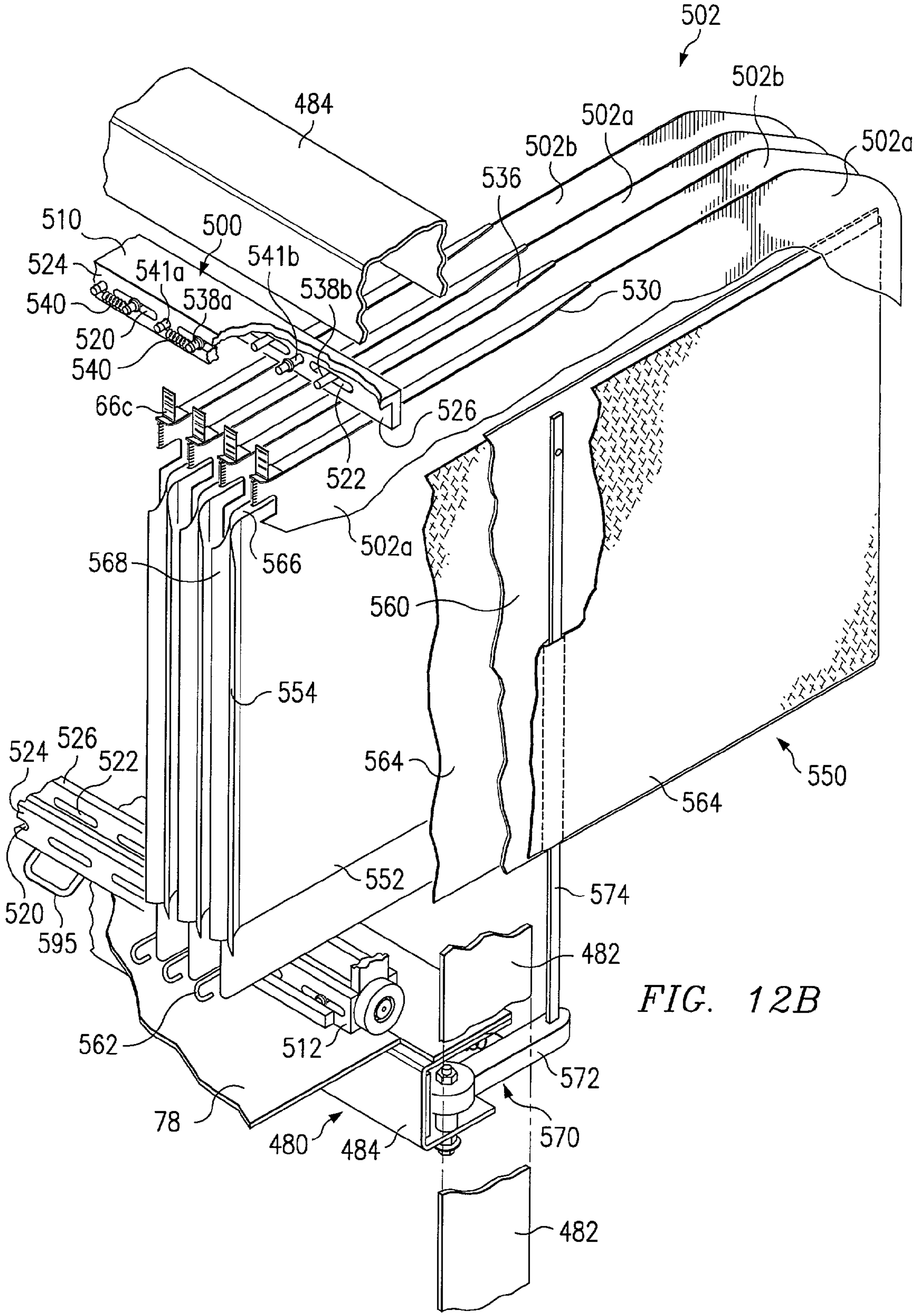
FIG. 12*b* is a cutaway view of the guide frame of FIG. 12, further illustrating a guide assembly for use in unloading a mail piece into a mail case.

Turning now to FIG. 11, four vertically aligned guide frames 80*a*, 80*b*, 80*c* and 80*d* corresponding to tiers 74*a*, 74*b*, 74*c* and 74*d* of mail case 70 are positioned in loading rack 480. As best illustrated in FIGS. 12 and 12*a*, each guide frame 80 includes a rigid rectangular frame 500 and a plurality of alternating partitions 502*a*, 502*b* mounted on frame 80 and each configured for insertion into a slot 72 in mail case 70. Each rectangular frame 500 includes vertical beams 514 and 516 and top and bottom channel members 510 and 512, respectively, extending between beams 514 and 516. As best illustrated in FIGS. 12*a* and 12*b*, channel members 510 and 512 are each formed from a C-shaped channel and positioned such that their open sides face each other. A plurality of slots 520 and 522 are formed in front and rear side walls 524 and 526 respectively, of channel members 510 and 512. As illustrated in FIG. 12B, slots 520 in front side wall 524 overlap slots 522 in rear side wall 526 along the length of each of the channel members 510 and 512.

Figure 12C:
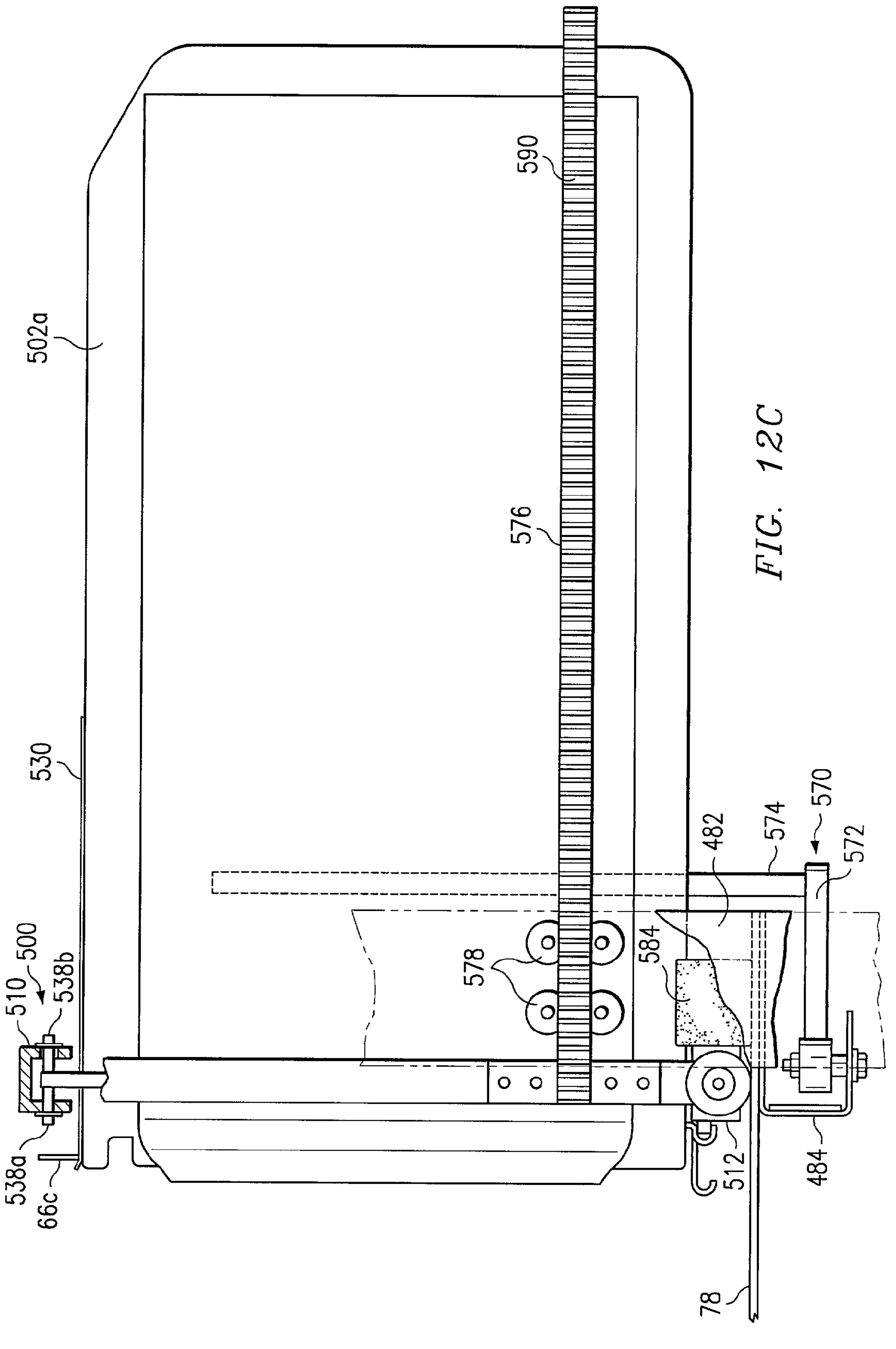
FIG. 12*c* is a cutaway side view of the guide frame of FIG. 12*a;*

Each of partitions 502*a* is formed with an associated pair of upper and lower mounting brackets 530 at the upper and lower front corners of the partition. Brackets 530 each have an L-shaped mounting pin 538*a* that extends upwardly then outwardly from partition 502*a* that is sized and configured to be slidably positioned one of a row of slots 520 in the front wall 524 of each channel members 510 and 512. Similarly, each of partitions 502*b* is formed with a pair of mounting brackets 536 at the upper and lower front corners of the partition including an L-shaped mounting pin 538*b* sized and configured to be slidably positioned in slots 522 in the rear side walls 526 of channel members 510 and 512. (Pins 538*a* extend up and then forwardly; pins 538*b* extend up and then rearwardly.) In FIG. 12*c*, one pin 538*a* is shown along with the rearwardly extending part of a pin 538*b* behind it. A spring 540 is connected to each of the mounting bars to bias mounting pins 538*a*, 538*b* and a stud 541*a*, 541*b* on channel member 510 to bias each of partitions 502*a*, 502*b* toward an adjacent partition. A bar coded tag 66*c* is mounted on each partition 502*a*, 502*b*, which tag 66*c* corresponds to a destination comprising a slot 72 in a mail case 70. Bar coded tags 66*c* enable robots 100 to locate and align with the slot assigned to the mail piece carried by the robot.

Alternating the sliding pin arrangement from front (pins 538*a*) to the back (pins 538*b*) in the arrangement of brackets 530, 536, together with slots 520 and 522 and mounting bars 538, permits partitions 502 to move laterally over a limited range within rectangular frame 500. Since slots 520 and 522 overlap, partitions 502*a* and 502*b* can move laterally across the same space within frame 500, providing a greater range of horizontal freedom than would otherwise be possible. This feature is particularly desirable where partitions 502*a* and 502*b* are to be inserted into a plurality of slots 72, each slot 72 containing a plastic bag held in a mail case 70 adopted to retain a plurality of such bags as described in co-pending U.S. patent application Ser. No. 09/924,155, filed Nov. 26, 2001, or in an embodiment where the case has no slot walls 71. The ability of the partition and guide to open extra wide permits one slot to borrow space from adjacent ones and become overfilled with mail. It also permits the slot to expand temporarily to permit the inserter to enter between the partition and guide. In an embodiment employing a plurality of plastic bags retained in a mail case 70, the ability of partitions 502*a* and 502*b* to move laterally to accommodate differing amounts of mail received in adjacent bags provides greater overall system capacity and flexibility.

Referring again to FIG. 11, each guide frame 80 has a pair of side rails 576 that are fastened to and extend perpendicularly from vertical beams 514 and 516 of rectangular frame 500. Side rails 576 are mounted between pairs of opposed wheels 578 that are in turn mounted on vertical beams 482 of rack 480, such that guide frame 80 may be extended from rack 480, as shown in FIG. 11. This permits partitions 502 to each enter a slot 72 of a mail case 70.

Each of racks 480 is provided with a guide frame drive assembly 588 (FIG. 11) wherein one or both of side rails 576 has a toothed rack 590 formed on its outer side. A pinion gear 592 mounted on shaft 594 drives rack 590 to extend guide frames 80 into tiers 74 of mail case 70. Shaft 594 is conventionally driven with a motor 600 with double-ended drive shaft 593 activated by an operator to extend and retract guide frame 80. Depending upon the particular design and application, it may not be necessary to provide drive assembly 588, in which case, guide frames 80 may be extended and retracted manually with a handle 595 as illustrated in FIG. 12*b*.

As will be appreciated, inserting a plurality of elongated flat, potentially flimsy items into a relatively narrow slot presents a number of difficulties. For example, if a first item is already positioned in the slot, there is a high probability that the second item inserted into the slot will catch on the first item when inserted, in which case both items may be damaged or crumpled or the second item may not enter the slot. Another problem is presented when the inserting device enters the slot. The inserting device may catch on an item previously placed in the slot, crumpling or damaging the item. When the inserting device is withdrawn from the slot, there is the possibility that the inserting device will drag one or more or the articles out of the slot when withdrawn. If the slot is a thin plastic bag, as disclosed and described in co-pending U.S. patent application Ser. No. 09/924,155, if the second item inserted or the inserting device catches on a first item previously inserted in the bag, the first item may tear or punch through the bag.

In order to overcome these difficulties, in accordance with the invention and as best illustrated in FIGS. 12*b* and 14*a*, each guide assembly 550 includes a slip sheet or plate 552 having an outwardly turned guide lip 554, and a stripper guide plate 560 outside of slip plate 552. Guide assemblies 550 are positioned between each of partitions 502*a*, 502*b*. Lip 554 aids in guiding inserter 142 as it is advanced between a partition 502 (both 502*a*, 502*b*) and a guide assembly 550. Additionally, each of partitions 502 may be provided with a low friction inner cover plate 566 with an outwardly turned lip 568 to facilitate insertion of inserter 142 between partition 502 and slip plate 552.

A fabric stripper belt 564 similar to belt 286 extends continuously around stripper guide plate 560 and is configured to slide around plate 560 as the plate is moved. A latch hook 562 is fastened to the front lower corners of slip-sheet 552 and stripper guide plate 560 such that guide assembly 550 may be pulled out of slot 72 by pulling hook 562 outwardly from frame 500. Hooks 562 are vertically oriented, and are shown horizontally in FIGS. 14A–14F for ease of reference only. A cross member 484 of loading rack 480 supports the bottom edges of slip sheet 552 and stripper guide plate 560 when guide assembly 550 is extended from (pulled out of) frame 500.

Each partition 502 is biased toward an adjacent partition 502 by one of a series of an L-shaped arms 570 each having a short end 572 pivotally mounted to horizontal beam 484 of rack 480 and a long end or post 574 extending upwardly between stripper belt 564 and stripper guide plate 560. Only one of the arms 570 appears in FIGS. 12*a*–12*c*, but it will be appreciated that a row of such arms is mounted to beam 484 side-by-side. Short end 572 of arm 570 is biased with a spring 580 (FIG. 12*a*, which is more preferably a more compact torsion spring) such that the post 574 bears against stripper guide plate 560. Post 574 also serves to anchor stripper belt 564, which is secured to long end of post 574 which holds the belt when guide assembly 550 is extended and retracted from guide frame 80, providing relative movement which helps prevent mail in the slot from spilling out as explained further below.

Referring again to FIG. 2, four guide frames 80*a*, 80*b*, 80*c* and 80*d* are initially positioned above respective shelves 78*a*, 78*b*, 78*c* and 78*d*. A mail case 70 including four tiers 74*a*, 74*b*, 74*c* and 74*d* of slots 72 is positioned adjacent to and locked to mail case loading rack 480 with a cam lock 582 or similar device, such that tiers 74*a*–74*d* are each aligned with a guide frame 80*a*–80*d*. To prepare mail case 70 for loading, guide frames 80*a*–80*d* are extended such that a partition 502 and guide assembly 550 are inserted into each of slot 72.

Referring again to FIG. 12*b*, in order to aid in alignment of the partitions with slot 72, a partition guide 584 may be mounted on an upper surface 485 of cross member 484 of mail case loading rack 480. In one embodiment, guide 584 comprises a resilient foam strip or plastic comb with a plurality of guide slots 586 formed therein for guiding partitions 502*a*, 502*b* as the partitions are extended into slots 72 of mail case 70.

Figure 13B:
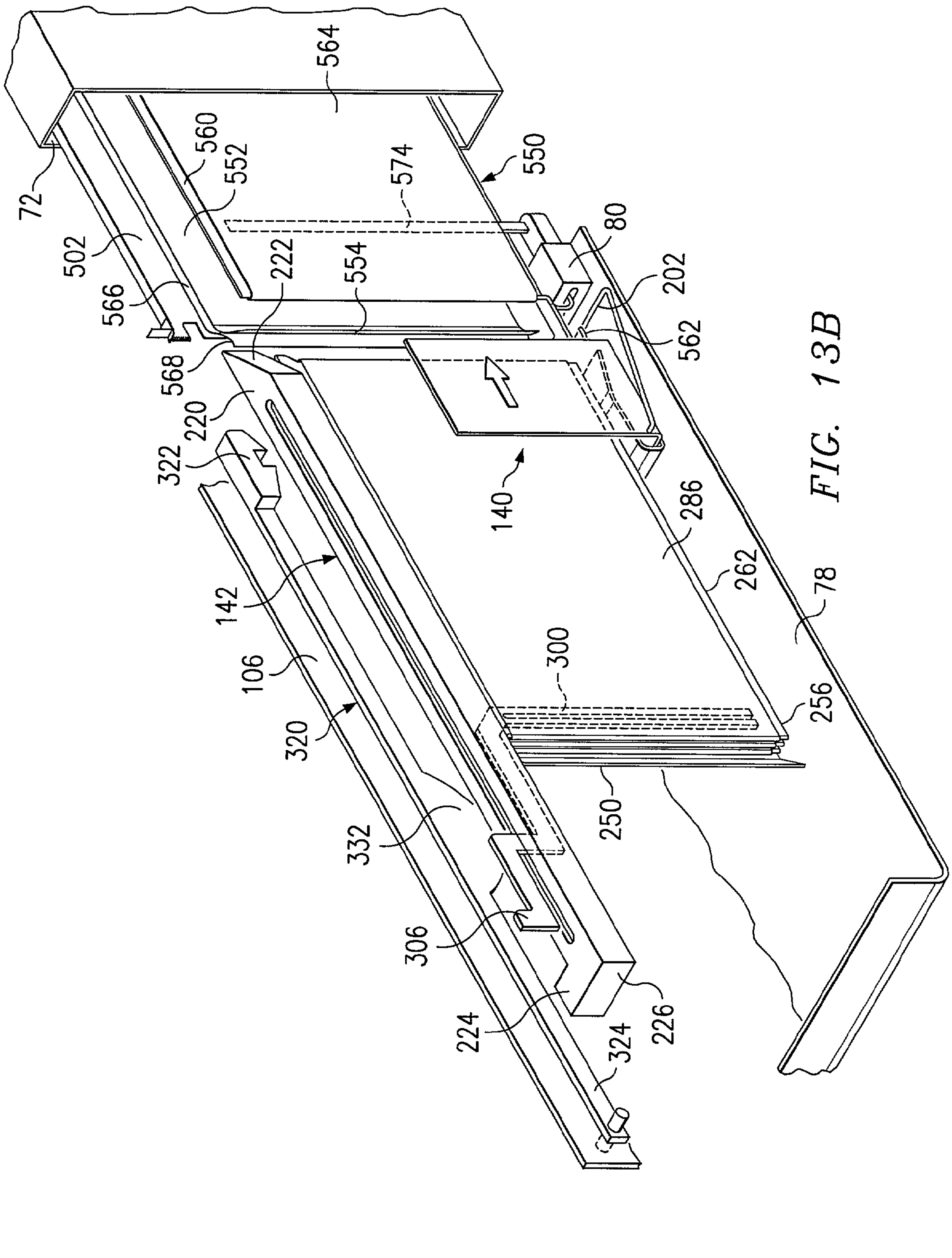
Figure 14B:
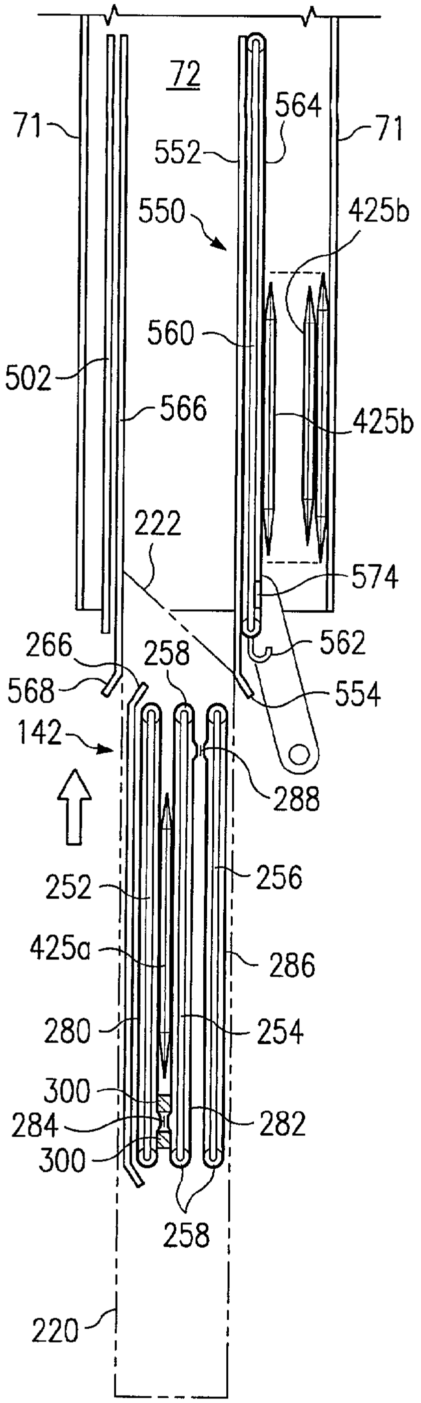

With guide frames 80 inserted into each tier of mail cases 70, each mail case 70 is ready to receive a incoming mail piece 425*a* from robot 100. Robot 100 locates the slot 72 selected by computer 30 to receive mail piece 425 using onboard bar code reader 122 to identify the tag 66*c* corresponding to slot 72 assigned by computer 30 to receive mail piece 425. Referring now to FIGS. 13*a* and 14*a*, robot 100 is positioned to initiate the unloading operation with one or more previously inserted mail pieces 425*b* positioned in slot 72 between stripper guide plate 560 and right wall 71. Robot 100, using bar coded tag 66*c* as a reference point, positions inserter 142 such that the assembly is aligned to be inserted into slot 72 between partition 502 and guide assembly 550. Onboard microprocessor 120 then activates motor 160, extending extractor 140 toward guide assembly 550 as illustrated in FIGS. 13*b* and 14*b*. As extractor 140 is extended, latch bar 202 travels along the lower edge 262 of stripper plate 256. The slope of ramp 205 forces latch 202 downward, so that when extractor 140 is fully extended, latch bar 202 is positioned below latch hook 562.

Figure 13C:
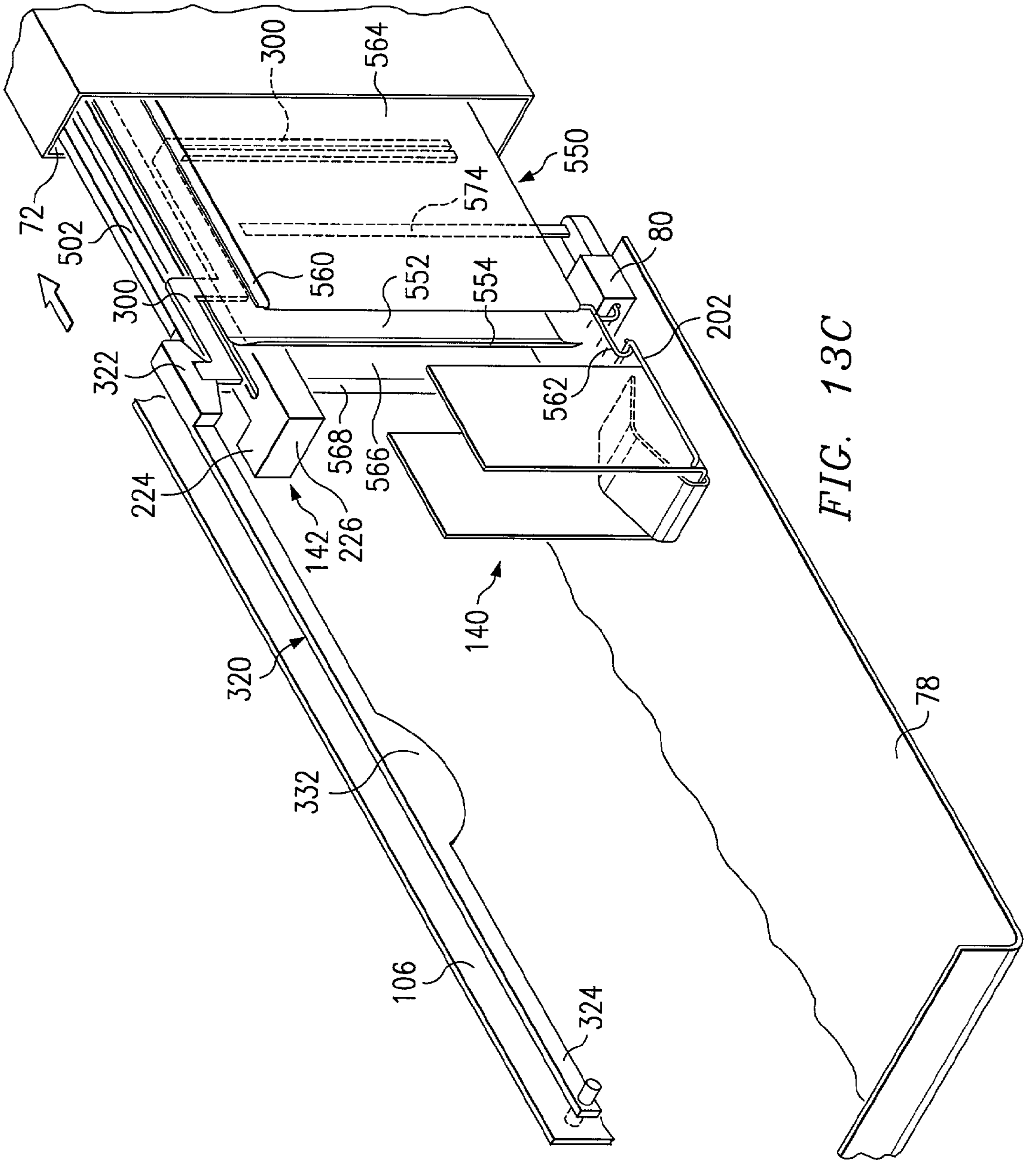
Figure 14C:
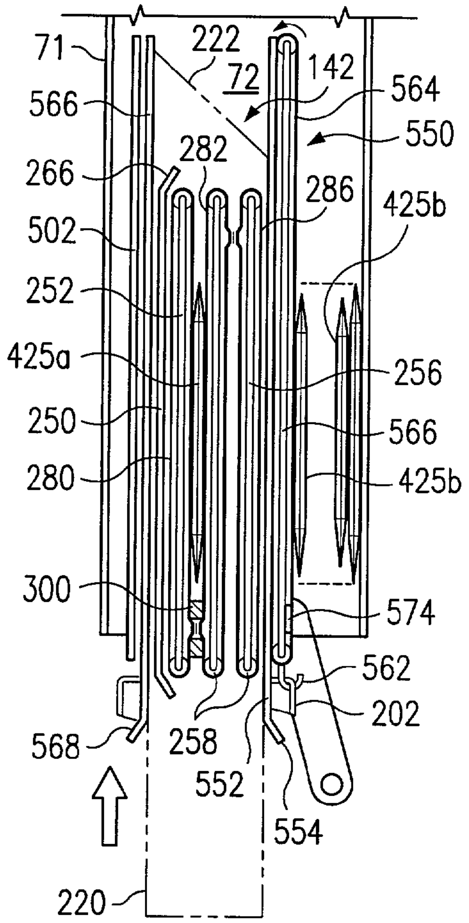

Next, microprocessor 120 activates motor 162, extending inserter 142 outwardly from robot 100 to position the inserter 142 between partition 502 and slip plate 552 as shown in FIGS. 13*c* and 14*c*. Outwardly angled lip 568 of cover plate 566 along with guide lip 554 of slip-sheet 552 aids in guiding inserter 142 into position between partition 502 and slip plate 552. As will be appreciated, the use of guide assembly 550 to separate mail pieces 425*b* from inserter 142 allows inserter 142 to extend into slot 72 without catching, bending or crumpling mail pieces 425*b*. This feature is especially desirable were slots 72 comprise deformable plastic bags that could be damaged if inserter 142 caught on an edge of mail piece 425*b* during the insertion process.

As inserter 142 is extended, inserter plates 252, 254 and web 284 are advanced with inserter bar 220, carrying belt post 300 outwardly from robot 100. Drive block 224 engages cam surface 332 of latch bar 320, pivoting the bar 320 upwardly in passing (FIGS. 7, 13A). As inserter 142 is further extended, drive block 224 passes cam surface 332 of latch bar 320, allowing latch bar 320 to return to its normal position. When inserter 142 is later retracted, post hook 322 catches the upper end tab 307 of belt post 300 as illustrated in FIG. 13*c*, preventing belt post slide 318 and belt post 300 from moving with the inserter plates until cam surface 322 is again engaged by drive block 224 from the other side, lifting latch bar 320 and disengaging post hook 322 from the upper end 307 of belt post 300.

Figure 13D:
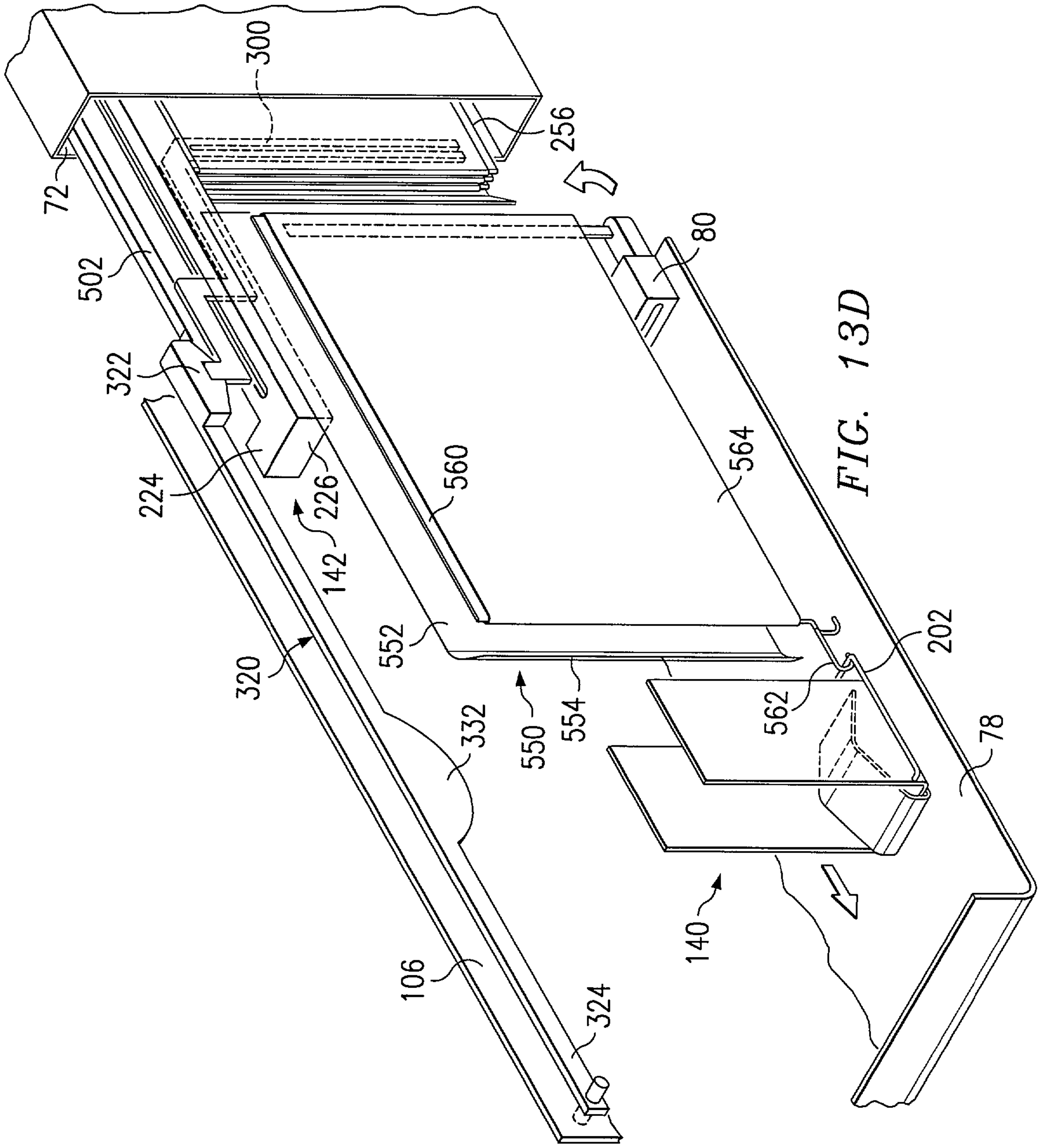
Figure 14D:
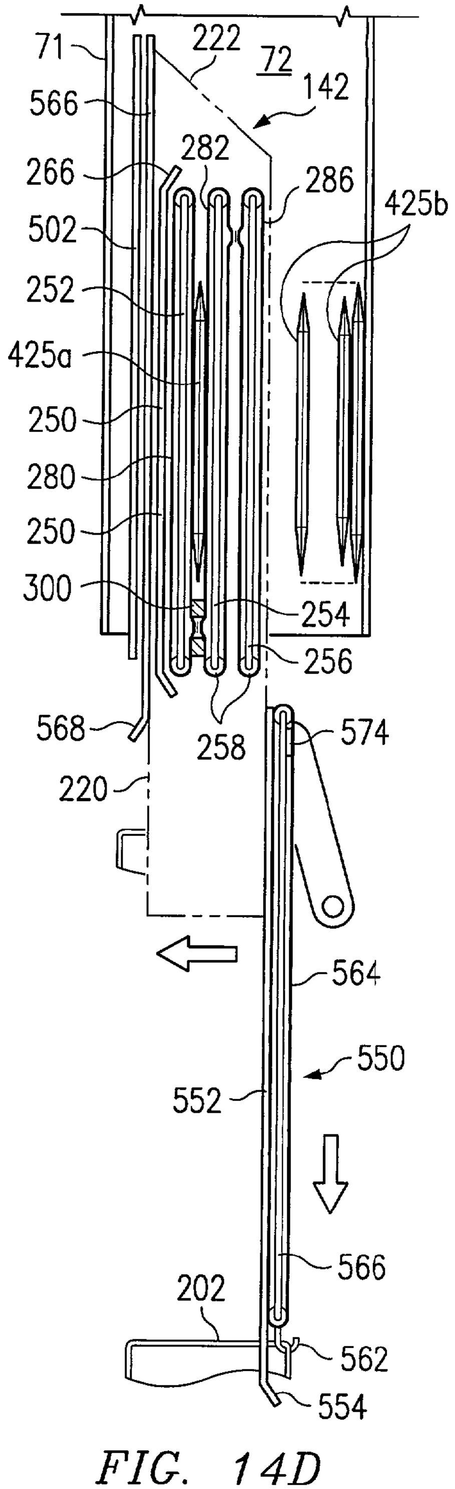

Edge 262 of stripper plate 256 disengages ramp-like arm 205 as inserter 142 is extended, allowing latch spring 204 to raise latch 202 so that it engages latch hook 562 as illustrated in FIGS. 13*c* and 14*c*. With latch hook 562 engaged, microprocessor 120 then re-engages motor 160 to retract extractor 140, pulling guide assembly 550 outwardly until the free ends of slip plate 552 and stripper guide plate 560 pass the inboard ends of plates 250–256 of inserter 142, as shown in FIGS. 13*d* and 14*d*. When the free ends of slip plate 552 and stripper guide plate 560 have cleared plates 250–256, spring-loaded arm post 574 pushes slip plate 552 and stripper guide plate 560 laterally across the inboard ends of plates 250–256 as indicated by the arrow in FIGS. 13*d* and 14*d* until guide assembly 550 contacts the side of lip 568. During extraction of guide assembly 550, arm post 574 forces belt 574 to slide around plate 560. As stripper belt 564 slides around plate 560 it is moving inwardly relative to the nearest mail piece 425*b*. This inward sliding of the belt negates frictional forces due to the outward movement of guide assembly 550 that might otherwise pull the nearest mail piece 425*b* out of the slot along with guide assembly 550.

Figure 13E:
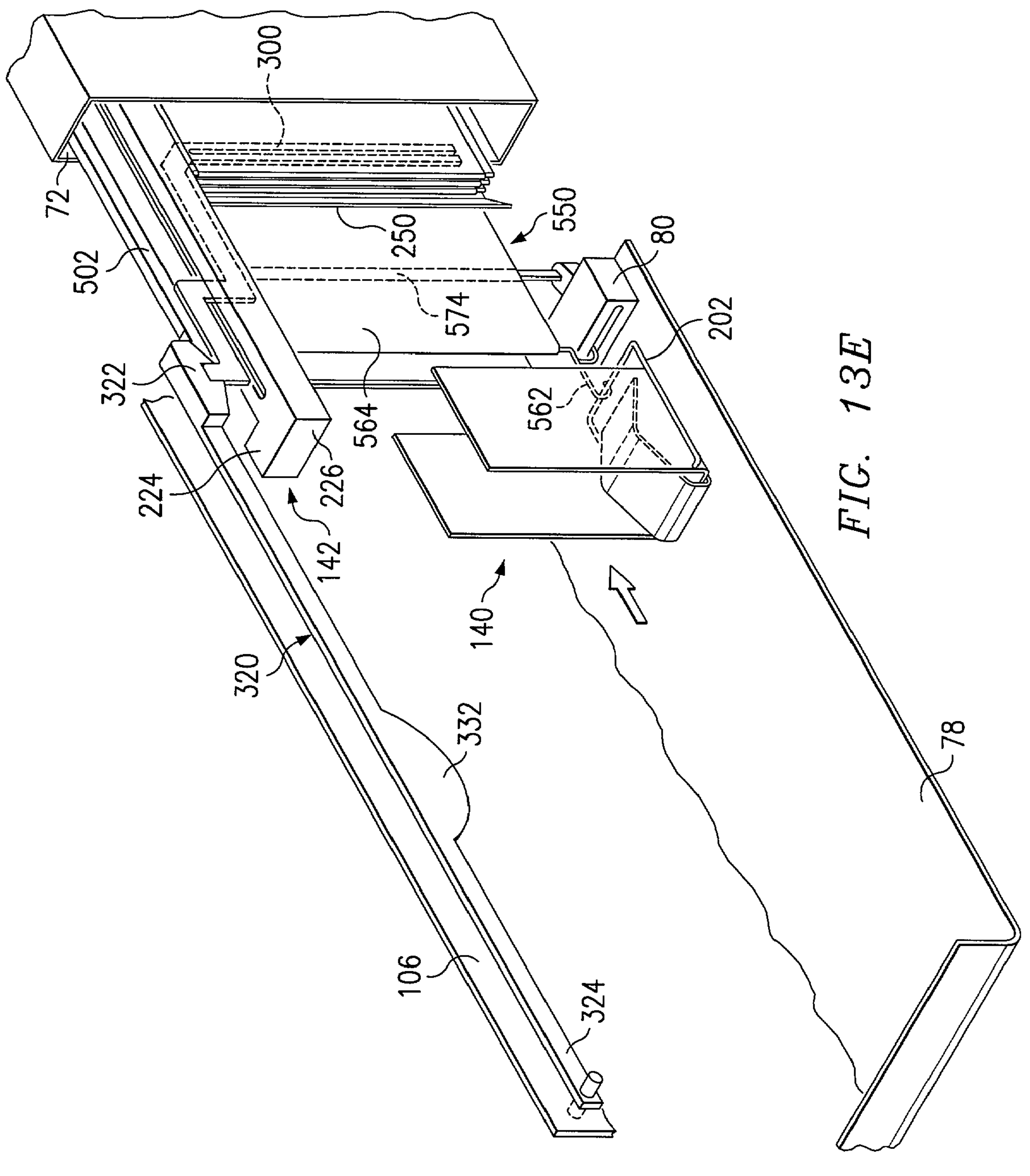
Figure 14E:
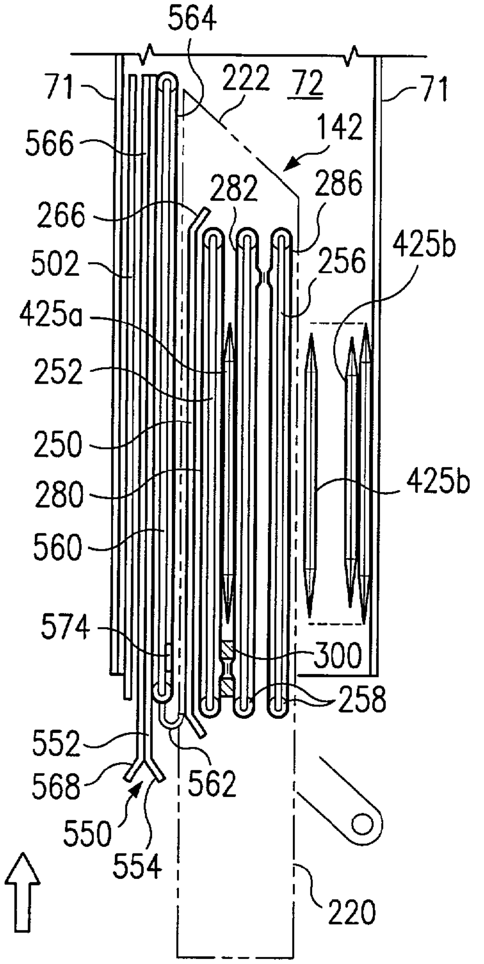

Microprocessor 120 then reverses the direction of motor 160, extending extractor 140 to insert guide assembly 550 between partition 502 and inserter 142 as illustrated in FIGS. 13*e* and 14*e*. Slip plate 552 and stripper guide plate 560 are thus repositioned on the side of inserter 142 opposite from the one where the plates were extracted. Also, as extractor 140 is extended, latch hook 562 is received in a frontwardly facing pocket 206 (FIG. 5) formed at the lower outboard end of C-shaped extractor frame 180, allowing extractor 180 to push instead of pull and preventing slip plate 552 and stripper guide plate 560 from moving laterally as the guide assembly 550 is reinserted.

As guide assembly 550 is extracted from slot 72, moving from the position illustrated in FIG. 14*c* to the position illustrated in FIG. 14*d*, stripper belt 564, anchored to post arm 574, is forced to slide around stripper guide plate 560 in the direction indicated by the arrow in FIG. 14*c*. Thus, as stripper guide plate 560 is retracted, stripper belt 564 slides around the guide plate and is peeled away from mail piece 425*b*, leaving the mail piece in slot 72 between stripper plate 256 of inserter 142 and wall 71 of slot 72. Absent stripper guide plate 560 and stripper belt 564, slip plate 552 would tend to drag mail piece 425*b* from slot 72 as guide assembly 550 is extracted from slot 72.

Figure 13F:
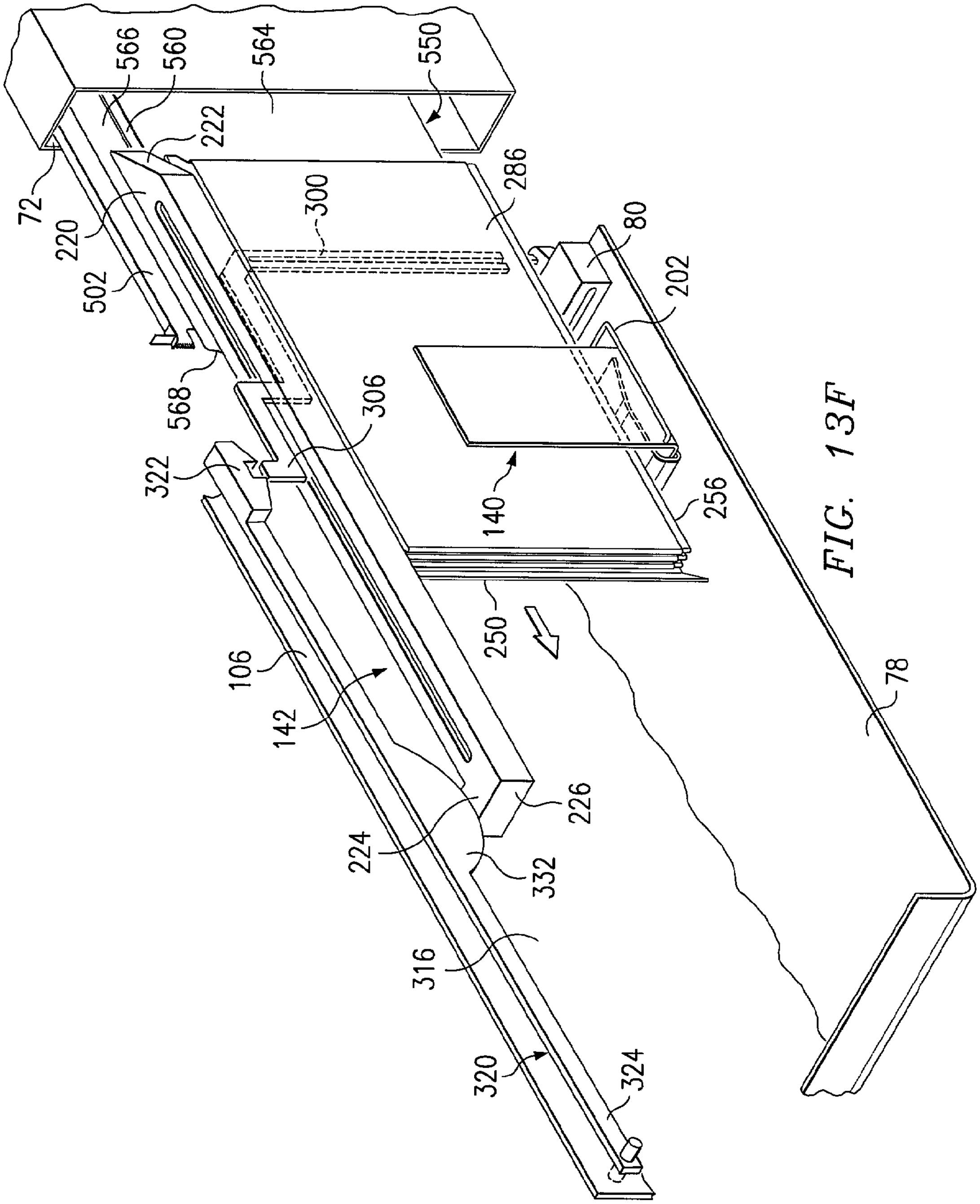
Figure 14F:
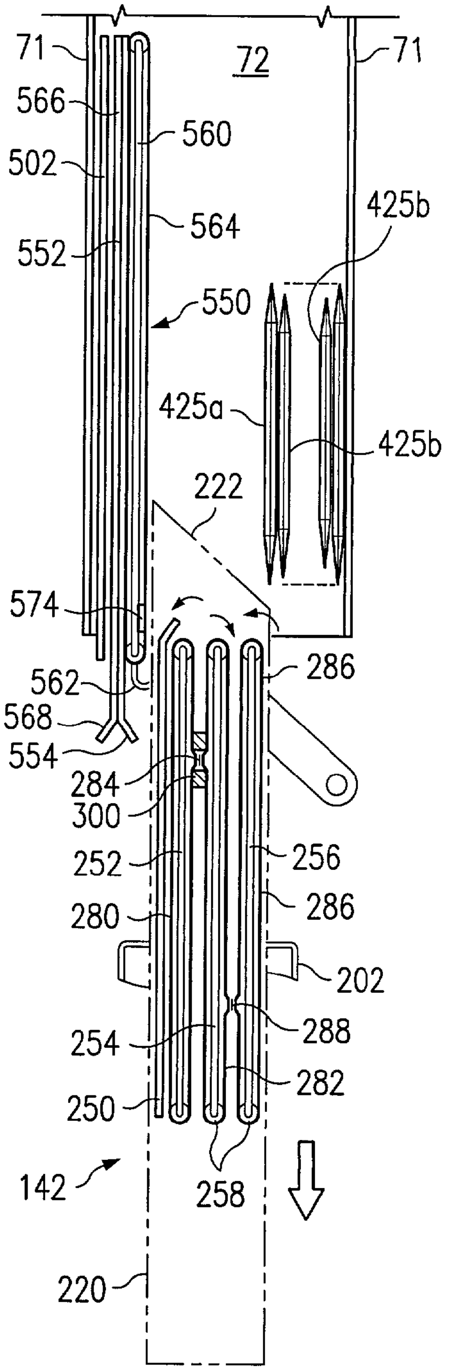
Figure 15:
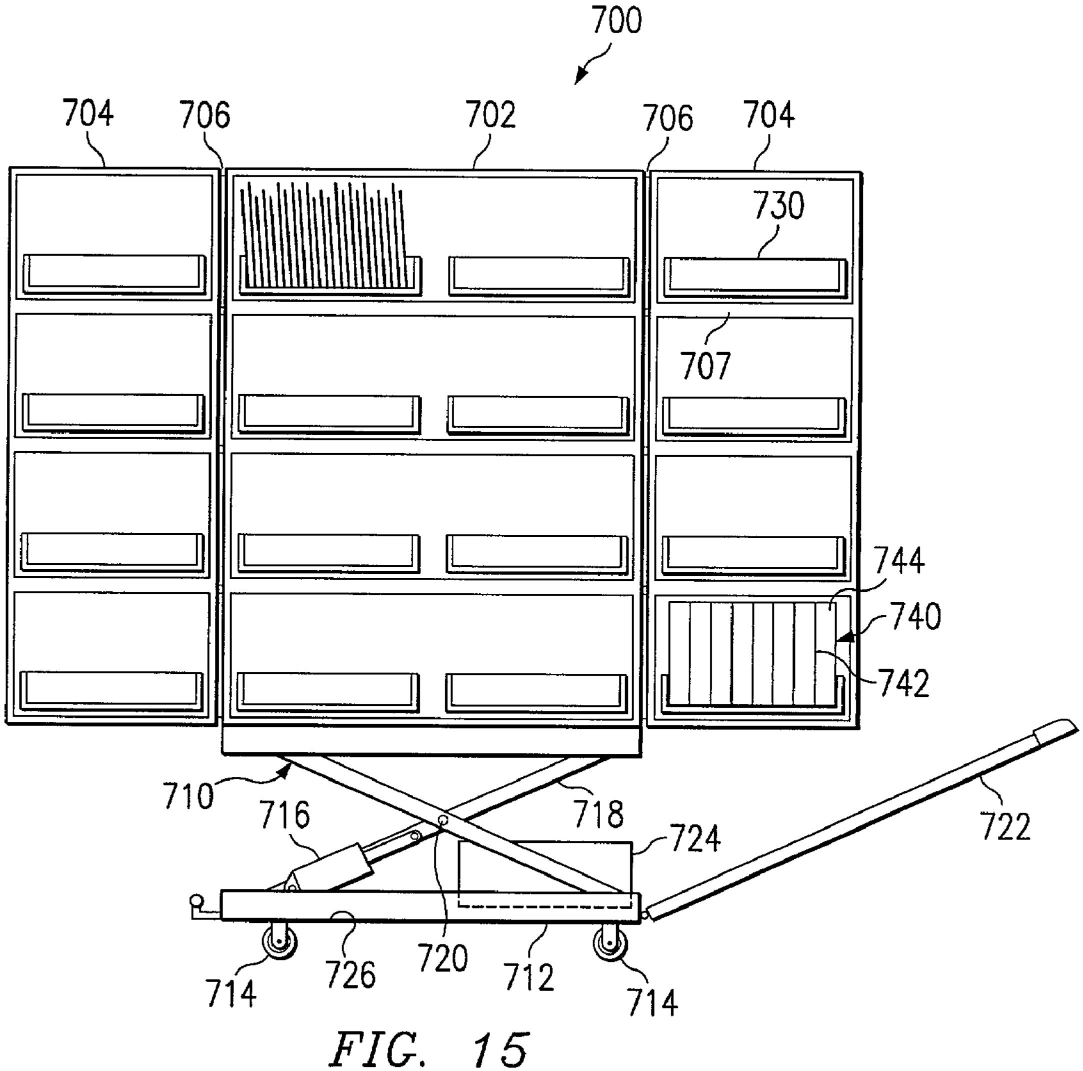
FIG. 15 is a front view of a portable mail case according to the invention.
Figure 16:
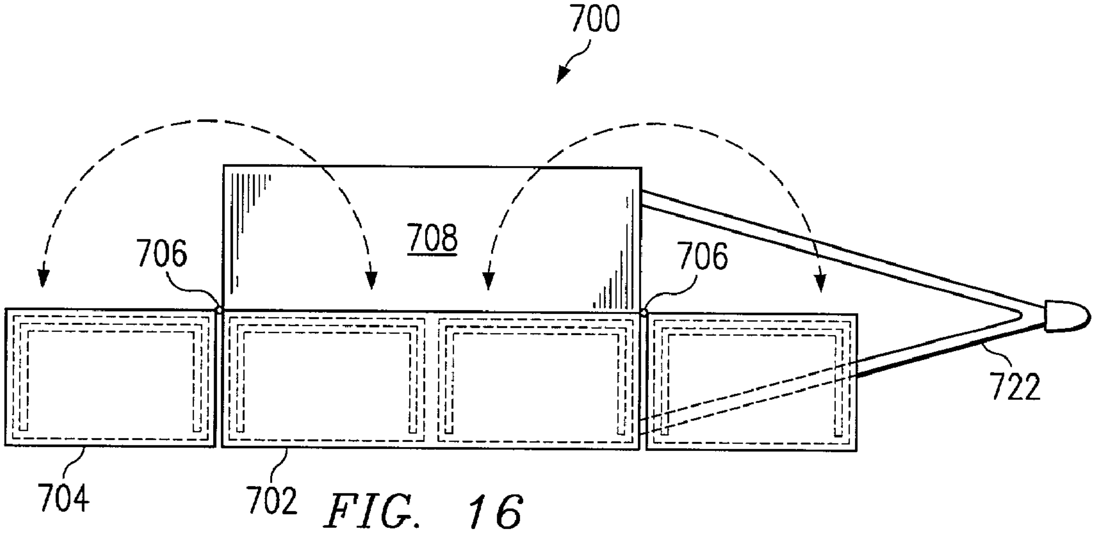
FIG. 16 is a top view of the mail case of FIG. 15.
Figure 17:
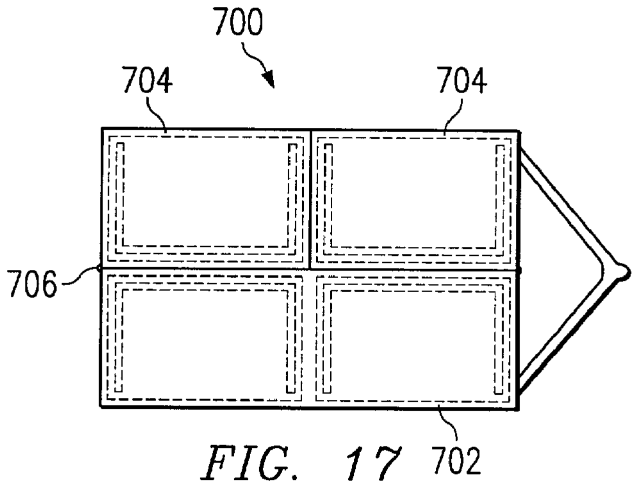
Figure 18:
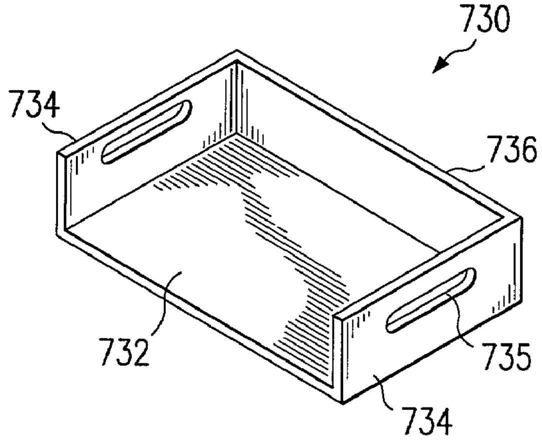
FIG. 18 is a perspective view of a mail tray according to the invention.
Figure 19:
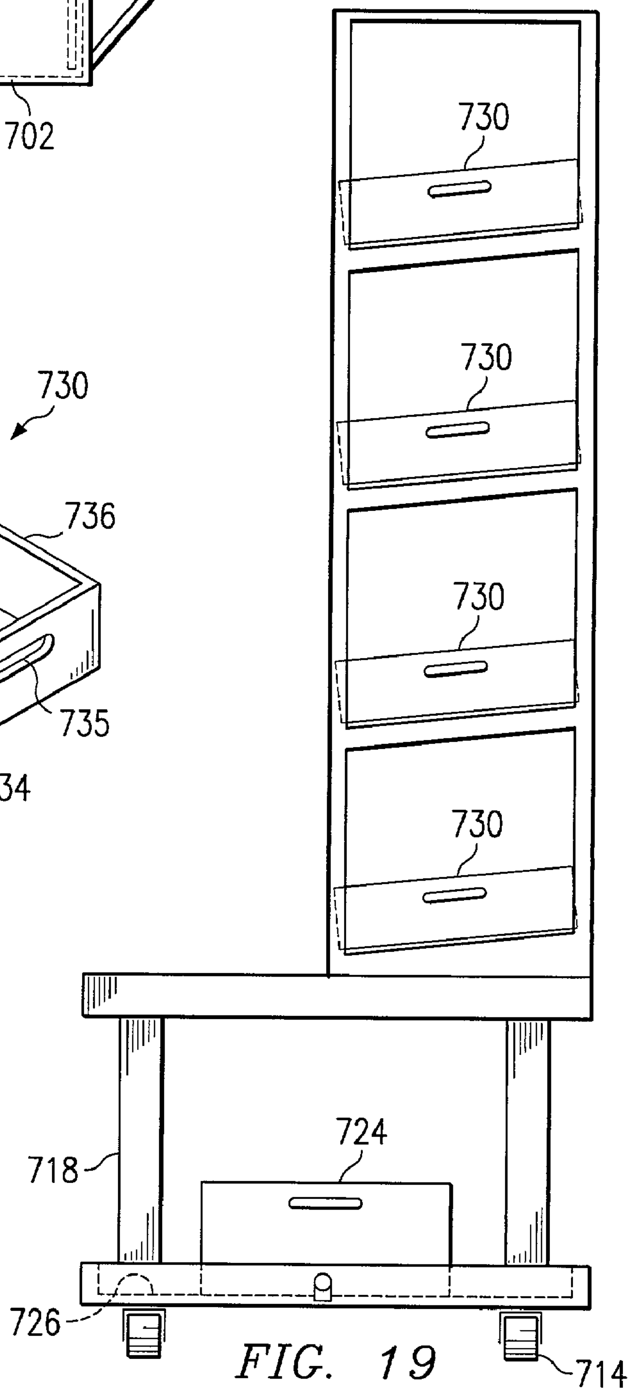
FIG. 19 is a side view, partly cut away, of the mail case of FIG. 15. It should be noted that FIGS. 10*a* and 14*a*–14*f* show the assemblies with exaggerated thickness for purposes of illustration.

Turning now to FIGS. 13*f* and 14*f*, after guide assembly 550 has been moved from a first position between inserter 142 and wall 71 (FIG. 14*c*) to a second position between partition 502 and inserter 142 (FIG. 14*e*), microprocessor 120 actuates drive motor 162, retracting inserter 142. As inserter bar 220 is retracted, post hook 322 of block bar 320 engages and blocks belt post 300 holding the bar stationary while post slide 318 slides on slide bar 310 (FIG. 7). Belt post 300 in turn holds web 284 stationary as inserter plates 252 and 254 are retracted. Since web 284 is held in a stationary position as inserter plates 252, 254 are retracted, inserter belts 280 and 282 are forced to slide around plates 252, 254 in the directions indicated by the arrows in FIG. 14*f*, releasing mail piece 425*a* from between belts 280, 282 with a peeling motion as belt post 300 and web 284 remain stationary and plates 252,254 retreat, causing relative movement. Thus, inserter belts 280, 282 release mail piece 425*a* without subjecting the mail pieces to forces that would tend to drag mail piece 425*a* from slot 72.

As inserter belts 280, 282 are forced to slide around inserter plates 252, 254, stripper belt 286, which is attached to inserter belt 282, is also forced to slide around stripper plate 256 which is retracted simultaneously with inserter plates 252, 254. As stripper belt 286 slides around stripper plate 256, it is pulled away from mail piece 425*b* with a peeling motion as described above, preventing mail piece 425*b* from being dragged from slot 72 as inserter 142 is retracted.

Simultaneously with or shortly after the release of mail piece 425 by belts 280, 282, drive block 224 engages a frontwardly facing portion of cam surface 332 of bar 320, causing the bar to pivot (FIG. 13*f*), lifting post hook 322. Belt post 300 and post slide 318 are thus freed to be retracted with inserter bar 220 as inserter 142 is further retracted. If inserter 142 is retracted to the point where the outboard ends of inserter plates 252 and 254 reach web 284 and belt post 300, the extractor can not be retracted any further unless belt post 300 and web 284 are released to move with the extractor. Thus, drive block 224 is located relative to cam surface 332 such that post 300 is released as or before the outboard ends of inserter plates 252, 254 reach web 284 and post 300 during the inserter retraction process. Additionally, as inserter 142 is retracted, contact between edge 262 and ramp 205 forces latch bar 202 down, disengaging the bar from latch hook 562. With latch hook 202 disengaged microprocessor 120 actuates drive motor 160 to engage and retract extractor 140, completing the unloading process.

Referring again to FIGS. 1 and 2, when the unloading process is completed, robot 100 resumes travel along track 60 and proceeds to a merge tower 52 where vertically arranged delivery loops or track segments 60*a*, 60*b*, 60*c* and 60*d* converge and are merged prior to the entrance to loading station 12.

As unsorted mail pieces enter mail handling and sorting system 10, destination information for each mail piece is determined utilizing one or more of fluorescent bar code reader 22, OCR 24 or a video encoding system (not shown) connected to the video image lift or scanner 26 at reader station 20. The destination information for each mail piece is stored in a database associated with central computer 30 as the mail pieces are scanned. Also stored in the database associated with computer 30 are the destinations on a given carrier's route along with the number and location of slots 72 in mail cases 70 into which mail pieces destined for a particular address or location are to be sorted. Utilizing this information and preprogrammed instructions, computer 30 assigns each mail piece read at reader 20 a destination code corresponding to a particular slot 72 in a mail case 70 as the mail piece is processed into system 10.

After a robot 100 is loaded with a mail piece, computer 30 transmits the destination code for the mail piece to the robot 100 as described above. If the destination information for the mail piece cannot be machine read and resolved, a video image of the mail piece, obtained by video image lift or scanner 26 is transmitted to a video encoding system for resolution by a human operator. While the human operator interprets and manually enters the address data, robot 100, following preprogrammed instructions or in response to a signal from computer 30 signals switch 68*e* to move into position to switch the robot onto full loop 60*f* The robot 100 carrying the unresolved mail pieces travels around "full" or idling/holding loop 60*f* until the destination information for the mail piece is resolved and entered into computer 30 which then transmits the destination code to the robot via infrared transmitter/receiver 132*c* positioned adjacent to full loop 60*f*. Robot 100 then signals switch 68*f* to direct the robot off the full loop and back onto outgoing track tower 50. Full loop 60*f* also provides a holding area for robots in the event that a down stream condition prevents one or more robots 100 from unloading, in which case full loop 60*f* serves as a buffer.

In order to prevent collisions between robots 100 as the robots move along track system 60, each of the robots 100 is provided with an anti-collision detector such as a proximity switch 126 (FIG. 10) or similar device for detecting another robot within a predetermined distance. When proximity switch 126 detects the presence of a second robot 100 within a predetermined distance, the switch sends a signal to onboard microprocessor 120 which stops or slows robot 100 until the second robot has moved beyond the predetermined distance. Robots 100 are also provided with an emergency signaling system comprising an infrared signal light 128 positioned on the exterior of robot 100. In the event that robot 100 is stopped due to a jam or other condition, microprocessor 120 is programmed to illuminate signal light 128. A plurality of infrared detectors 54 (FIG. 1) are positioned around track system 60 to detect emergency signals from robots 100 and then signal computer 30. Also as shown in FIG. 10, each of robots 100 may be additionally provided with a mono frequency transmitter 134 that transmits a single, low frequency signal over power rail 64 in the event that microprocessor 120 identifies one or more conditions requiring an emergency response, for example failure of traction drive motor 110. In the event of an emergency condition, computer 30 is programmed to shut down mail sorting and handling system 10 or to initiate other appropriate action in the event that a signal from one of detectors 54 is received.

Empty robots 100 returning to the loading station 12 are merged onto incoming merge or empty tower 52 and track 60*e*. If a predetermined number of robots 100 are in the queue for loading, computer 30 signals switch 68*g* to route robot 100 onto empty loop 60*g*, which serves as a buffer or staging area until additional robots are required at the loading station. When computer 30 determines that additional robots 100 are required at loading station 12, the computer signals switch 68*h* to switch empty robots 100 off of empty loop 60*g* onto track segment 60*e*, directing the empty robots into loading station 12.

A reject or recycle station may be provided for mail pieces with destination information that cannot be resolved and must be returned for further processing. A robot 100 carrying such an unresolvable mail piece is directed to the recycle station by computer 30 where the mail piece is discharged, freeing the robot to return to the loading station. Additionally, a maintenance sidetrack may be provided. In one embodiment, robots 100 are programmed to proceed to the maintenance side track upon sensing a fault condition requiring servicing, utilizing transmitter/receiver 130 to communicate with one or more switches 68 to route the robot to the siding. In addition to empty and full loops 60*f* and 60*g*, additional staging and shunt track sections may be incorporated as needed to insure that sufficient buffer space is provided to avoid grid-locking system 10.

In an alternative embodiment two loading stations 12 are used, with one station dedicated to processing letter mail and the second dedicated to processing flats, along with two full towers 50, two merge towers 52, empty and full loops 60*f* and 60*g*. In this embodiment, assuming that the mail is approximately 75% letter mail and 25% flats, between 800 and 1000 robots 100 are anticipated to deliver mail pieces to between 15,000 and 20,000 slots 72 at a rate of between 14,000 and 15,000 mail pieces per hour. The mail cases 70 used in this embodiment are configured with approximately 160 slots arranged in 4 tiers 72. In this embodiment, slots 72 are preferably plastic bags, and cases 70 are mobile, such that a loaded case may be wheeled to an unloading area where a carrier will remove the bags corresponding to addresses on his or her route. To prepare mail handling and sorting system 10 for a sorting run, a plurality of empty mail cases 70 are positioned along track system 60 at locations corresponding to loading racks 480 and secured in position with locks 582.

To enable an operator to readily position empty mail cases 70 and disengage filled mail cases, each of mail cases 70 is provided with casters or wheels 82. With mail cases 70 positioned and locked, the operator engages guide frame drive assembly 588 to insert guide frames 80 into slots 72 of mail cases 70. After the guide frames have been inserted into mail cases 70, a batch of unsorted mail pieces are loaded into feeder 12 at loading station 12 to begin a sorting cycle. During the cycle, unsorted mail is periodically loaded onto feeder 12 until the batch has been sorted to slots 72 in mail cases 70. When the sort cycle is completed, the operator deactivates mail-handling system 10, and engages guide frame drive assemblies 588 to retract guide frames 80 from mail cases 70. The operator then unlocks mail cases 70 and repositions the cases for unloading by the carrier. Since the mail has been sorted into delivery order with each slot corresponding to a destination address, the carrier is required only to retrieve the sorted mail from slots 70, after which the carrier can begin his or her route without the necessity of additional hand sorting by delivery point. In the embodiment where slots 72 comprise plastic bags, the carrier simply removes the bags, with the mail sorted into the bags by delivery point on his or her route, and begins the route.

Referring to FIGS. 15 to 19, an improved form of case 700 can be used instead of case 70. Case 700 is rectangular and has a center section 702 and a pair of identical wing sections 704 on opposite sides of center section 702, each connected by a hinge 706 mounted on the front corner of center section 702. Each section 702, 704 is divided into a number of tiers by horizontal shelves 707. Case 700 rests on a rectangular top 708 of a cart 710 having the same width as center section 702. As shown, center section 702 rests on the back half of top 708 of cart 710, with wings 704 overhanging on each side. When wings 704 are folded in on hinges 706 for compact transport, they occupy the front half of top 708. Top 708 is supported from below by a frame 712 which rolls on casters 714. Frame 712 may permit the height of top 708 to be adjusted, such as by means of a pneumatic or hydraulic cylinder 716 which adjusts the position of accordion-style pairs of X-beams 718 that move about a central pivot 720. Frame 712 also includes a pull 722, so that case 700 can be rolled away manually. A bin 724 for residual mail pieces may be provided on a lower deck 726 of frame 712.

Case 700 contains a number of trays 730 which rest side by side on shelves 707, two in center section 702 and one each on wings 704. There are 4 trays per row, 16 total trays when 4 tiers are provided. Each tray comprises a flat bottom 732, a pair of opposed side walls 734 with handholds 735, and a back wall 736, leaving the front open. Shelves 707 may be slightly angled (e.g., about 1–20 degrees) in a rearward direction, so that when trays 730 are placed therein with the front side facing outward as shown, mail tends to remain in the tray by the force of gravity. Trays 730 may be made from molded plastic and fit precisely within the open front of case 700.

When case 700 is in position for sorting, mail is sorted directly to trays 730. For this purpose, trays may be provided with parallel partition walls that correspond to side walls 71 in case 70. However, this takes up additional space and prevents the mail from being easily removed from the tray 730 by the postal carrier. Accordingly, it is preferred to used a multi-bag as described in the foregoing U.S. patent application Ser. No. 09/924,155, filed Nov. 26, 2001, or a removable partition insert 740 in the form of a series of slot-defining walls 742 united by a back wall 744. Partition inserts 740 can then be removed manually after sorting is completed.

Divider cards, which may be colored for easy identification and optionally printed with advertising, if intended for delivery to the postal customer, may be sorted to each slot before or after the mail is sorted, so that upon removal of the insert 740, the carrier can see where one delivery point ends and another begins, rather than having to leaf through the mail. Thin colored paperboard cards may be used for this purpose even if case 70 with fixed slots is used.

A number of steps of current postal processing can be avoided by means of portable case 700. Rather having a carrier pull down mail manually and place it into trays, the mail is sorted directly into trays, which can then be removed and carried to a staging area for final delivery. If the postal carrier is delivering mail by truck, it may be possible for on or more cases 700 to roll up a ramp onto the truck, so that the mail remains therein until the time of delivery. If the mail is then to be removed from the tray and put in a postal satchel, the bags or divider cards maintain the division between mail for each address, reducing delivery time.

The invention in its various aspects provides a number of key advantages that allow automated sorting to relatively narrow vertically oriented slots. The use of rolling sheets on the outside of the guide and optionally the partition (if acting as the slot wall) prevents mail in slots from being dragged out at the end of the day during automatic extraction of the guides and partitions. The staggered, overlapping grooves in which the mounting pins 538*a*, 538*b* are mounted allow the guide and partition to displace to temporarily allow room for the inserter during insertion, and to allow partial overfilling of the slot. Rolling cases as described above decrease the total number of steps in the process by permitting simultaneous sortation, bagging, traying and containerizing. Finally, the invention can operated in a variety of ways, that is, with or without divider cards, bags or a clustered (U-shaped) holder for the mail piece being carried by the inserter.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, a tug or locomotive could be used to pull one or more delivery robots along the track if it is not desired to incorporate an integral drive in the delivery robot. It will also be appreciated that a variety of known sensors, limit switches, proximity switches and the like may be utilized in addition to, or as replacements for the control mechanisms described herein. While belts that negate relative movement have been described as the preferred way of preventing mail from being pulled out of the slot, other means such as extremely low friction surface materials could be employed.

All such variations and additions are specifically contemplated to be with the scope of the invention. It is, therefore, intended that the appended claims encompass any such modifications or embodiments.

The invention claimed is:

1. A method for sorting mail to a case having a row of upright slots, wherein each slot corresponds to a destination, comprising:

(a) loading a mail piece to be sorted into a delivery robot;

(b) determining for the mail piece a destination slot the mail piece is to be delivered to;

(c) moving the delivery robot along a rail disposed at the front side of the case near the slots into proximity with an open end of the destination slot;

(d) holding the mail piece in an insertion mechanism while extending the insertion mechanism from the robot into the slot;

(e) releasing the mail piece from the insertion mechanism while both the insertion mechanism and mail piece are in the slot;

(e) retracting the insertion mechanism from the slot;

(f) preventing contact between the mail piece and the retracting insertion mechanism from causing the mail piece to be pulled out of the slot with the retracting insertion mechanism; and (g) returning the delivery robot to a loading station whereby steps (a)–(e) may be repeated.

2. The method of claim 1 wherein the delivery robot moves horizontally along a rail mounted to the side of a horizontal row of upright slots that receive mail pieces from the delivery robot through the open front sides thereof.

3. The method of claim 1, wherein the insertion mechanism includes a pair of flat plates that cover the mail piece from opposite sides.

4. The method of claim 3, wherein the insertion mechanism has movable surface elements disposed on the flat plates that move with the mail piece until the mail piece exits from a front end opening of the insertion mechanism.

5. The method of claim 4, wherein the mail piece is first inserted into the slot and then the insertion mechanism is withdrawn in a manner that leaves the mail piece behind.

6. The method of claim 5, wherein the surface element comprises a belt wound about one of the flat plates, and the insertion mechanism includes a belt engaging element that moves the belt around the plate, whereby an inner side of the belt moves with the mail piece during the step of inserting the mail piece.

7. The method of claim 1, further comprising preventing mail pieces already present in the slot from being pulled out of the slot along with the insertion mechanism during the retracting step.

8. The method of claim 7, further comprising a step of forming a space for the insertion mechanism to enter the slot without contacting mail pieces already present in that slot.

9. The method of claim 8, wherein the step of forming a space further comprises:

inserting a guide into each slot before sorting to the slots;

inserting the mail piece to one side of the guide; and repositioning the guide on the opposite side of the mail piece just inserted, so that another mail piece may be inserted between the guide and one side of the slot.

10. The method of claim 9, wherein the insertion mechanism includes a pair of flat plates that cover the mail piece from opposite sides and has a movable surface element disposed on at least one of the flat plates that moves with the mail piece until the mail piece exits from a front end opening of the insertion mechanism, and the preventing step further comprises, after the step of repositioning the guide, moving the movable surface element along the outside of the plate adjoining mail already present in the slot so that the surface element does not slide relative to mail already present in the slot.

11. The method of claim 1 further comprising, prior to step (a):

scanning destination information from each mail piece to be transferred to a slot; and storing the scanned information on a computer for use in step (b).

12. The method of claim 11, further comprising downloading to a controller on the delivery robot instructions identifying the destination slot, whereby the controller actuates the insertion mechanism upon reaching the destination slot to perform step (c).

13. The method of claim 12, further comprising, prior to step (c), a step of detecting the destination slot by using a sensor on the delivery robot connected to the controller, which sensor reads indicia proximate the slot identifying the slot as the destination slot.

14. The method of claim 13, wherein step (c) further comprises:

moving the delivery robot along the rail;

scanning a slot identifying indicia disposed proximate each slot the delivery robot passes with a scanner mounted on the delivery robot;

if the scanned slot is the one determined in step (b), then stopping the delivery robot at that slot.

15. The method of claim 1, wherein the slots comprise mouths of a row of flexible bags, which bags have been mounted on the case, further comprising positioning a stiffening frame in front of the row of flexible bags so that stiffening plates of the frame extend into the mouths of each of the bags.

16. The method of claim 1, wherein the slots comprise spaced vertical dividers secured to the case to form slots having fixed widths.

17. The method of claim 1, wherein the slots comprise spaced vertical dividers inserted into the case but not secured thereto.

18. The method of claim 17, wherein the spaced vertical dividers are disposed in a tray having an open side, which tray is removably placed in the case.

19. An automated system for sorting a series of mail pieces, comprising:

a rail system including a loop;

a number of mail piece delivery robots mounted on the rail for movement along the loop, each delivery robot having an insertion mechanism that can receive a mail piece therein and then insert it into an open side of a destination slot;

an automated loading station including a conveyor having a loading end at which a mail piece exits the conveyer and enters the insertion mechanism of a delivery robot positioned on the rail in alignment with the loading station;

a case disposed along the rail having a row of the destination slots for receiving mail sorted thereto for a plurality of destinations;

means for moving the delivery robots from the loading station to the case and back to the loading station on the loop;

a control system that coordinates movement of the delivery robots so that each delivery robot moves from the loading station to a slot which corresponds to a destination indicated on the mail piece and then returns to the loading station to receive another mail piece for sorting; and a proximity sensor mounted on each delivery robot, the proximity sensor detecting another delivery robot ahead of the robot on which the sensor is mounted within a predetermined distance, and communicating with the control system to prevent collisions between delivery robots.

20. The system of claim 19, wherein the control system comprises control units on each inserter and means for transmitting slot delivery instructions to each inserter control unit.

21. The system of claim 19, further comprising a loading rack mounting a plurality of moveable guides configured for insertion into the case.

22. The system of claim 21, wherein the loading rack further mounts a plurality of partitions paired with the moveable guides, so that a partition and guide are inserted into the case for each sorting destination.

23. The system of claim 22, wherein the moveable guides and partitions are mounted on a movable guide frame, the guide frame being mounted on the loading rack for inserting the guides and partitions into a horizontal shelf of the case.

24. The system of claim 19, further comprising an emergency transmitter mounted on each delivery robot, which emergency transmitter communicates with the control system upon detection of one or more predetermined fault conditions.

25. The system of claim 9, wherein the insertion mechanism includes a drive system whereby the insertion mechanism can be extended from and retracted back into the delivery robot.

26. An automated system for sorting a series of mail pieces, comprising:

a rail system including a loop;

a number of self-propelled delivery robots mounted on the rail for movement along the loop, each of the robots including an onboard drive system and power source for moving the robot along the loop, each delivery robot having an insertion mechanism that can receive a mail piece therein and then insert it into an open side of a destination slot;

an automated loading station including a conveyor having a loading end at which a mail piece exits the conveyor and enters the insertion mechanism of a delivery robot positioned on the rail in alignment with the loading station;

a case disposed along the rail having a row of the destination slots for receiving mail sorted thereto for a plurality of destinations; and a control system that coordinates movement of the delivery robots so that each delivery robot moves from the loading station to a slot which corresponds to a destination indicated on the mail piece and then returns to the loading station to receive another mail piece for sorting.

* * * * *